(12) United States Patent
Frederick et al.

(10) Patent No.: US 9,965,787 B2
(45) Date of Patent: May 8, 2018

(54) SYSTEM AND METHOD FOR CONVEYING PRODUCT INFORMATION

(71) Applicant: EdgeAQ, LLC, Nashville, TN (US)

(72) Inventors: Thomas Richardson Frederick, La Quinta, CA (US); Adam Ford Redd, Atlanta, GA (US); Brian Mark Rudolph, Lisbon, WI (US); Robert Bruce Smith, Watertown, WI (US); Cory Michael Payne, Pewaukee, WI (US); Joseph A. Czarnecky, Okauchee, WI (US); Scott Rudolph, Waukesha, WI (US)

(73) Assignee: EdgeAQ, LLC, Nashville, TN (US)

( * ) Notice: Subject to any disclaimer, the term of this patent is extended or adjusted under 35 U.S.C. 154(b) by 831 days.

(21) Appl. No.: 14/075,770

(22) Filed: Nov. 8, 2013

(65) Prior Publication Data

US 2014/0129388 A1    May 8, 2014

Related U.S. Application Data

(60) Provisional application No. 61/724,060, filed on Nov. 8, 2012.

(51) Int. Cl.
*G06Q 30/00* (2012.01)
*G06Q 30/06* (2012.01)

(52) U.S. Cl.
CPC ................. *G06Q 30/0623* (2013.01)

(58) Field of Classification Search
CPC ................. G06Q 30/00; G06F 17/30
USPC ................................. 705/3, 27.2
See application file for complete search history.

(56) References Cited

U.S. PATENT DOCUMENTS

| | | | |
|---|---|---|---|
| 6,810,401 B1 | 10/2004 | Thompson et al. | |
| 7,107,226 B1 | 9/2006 | Cassidy et al. | |
| 7,219,100 B2 | 5/2007 | Gadamsetty et al. | |
| 7,461,049 B2 | 12/2008 | Thompson et al. | |
| 7,805,461 B2 | 9/2010 | Gadamsetty et al. | |
| 7,860,690 B2 | 12/2010 | Gadamsetty et al. | |
| 7,869,981 B2 | 1/2011 | Pendyala et al. | |
| 7,979,314 B2 | 7/2011 | Ulenas | |
| 8,135,758 B2 | 3/2012 | Bradateanu et al. | |
| 8,280,700 B2 | 10/2012 | Pendyala et al. | |
| 8,582,802 B2 | 11/2013 | Clippard et al. | |
| 8,606,657 B2 | 12/2013 | Chesnut et al. | |
| 2008/0033939 A1* | 2/2008 | Khandelwal | G06F 17/30707 |
| 2009/0228233 A1* | 9/2009 | Anderson | G06Q 10/10 702/127 |
| 2010/0174557 A1* | 7/2010 | Bundschus | G06Q 10/00 705/3 |

(Continued)

*Primary Examiner* — Rokib Masud
(74) *Attorney, Agent, or Firm* — Thomas | Horstemeyer, LLP

(57) ABSTRACT

A system and method for conveying product information. The system includes an interactive product guide that has product options linked to a product database comprising product data organized in an ontology and a taxonomy. The product options dynamically switch from being available or unavailable for selection by a user depending on prior option selections by the user. Product data from the product database corresponding to products characterized by the selected options are presented to the user. Methods for using the system include presenting the system to a user for interaction therewith.

21 Claims, 27 Drawing Sheets

(56) References Cited

U.S. PATENT DOCUMENTS

2012/0005044 A1* 1/2012 Coleman ............... G06Q 30/02
           705/27.2
2012/0310781 A1* 12/2012 Battle .................... G06Q 30/00
           705/26.63

* cited by examiner

FIG. 3

SYSTEM AND METHOD FOR CONVEYING PRODUCT INFORMATION

CROSS-REFERENCE TO RELATED APPLICATIONS

This application claims priority under 35 USC § 119(e) to U.S. Provisional Patent Application 61/724,060 filed Nov. 8, 2012, the entirety of which is incorporated herein by reference.

BACKGROUND

Since the advent of Internet marketing and sales, the percentage of sales taking place over the Internet continues to increase. The accuracy of the product information presented on the Internet is critical for such sales to occur. This poses a recurring problem for a seller, who must keep the list of products, as well as the information relevant to those products, current. For a buyer, access to neutral, third party advice about products is important in sales over the Internet because there is no salesperson present to answer questions. For both the seller and buyer, it is equally important that the product ultimately sold and delivered to the buyer matches the qualities and attributes desired by the buyer. Delivering a product that meets the buyer's expectations yields a satisfied buyer and reduces merchandise returns to the seller.

One aspect of online retailing is the provision of online reviews. Online buyers cannot personally handle the actual merchandise to gauge quality and explore the features of the merchandise. Online buyers therefore typically resort to perusing online reviews. Common types of online reviews include the "comments" or "reviews" sections provided on retailers' websites. Other types of online reviews include third-party websites devoted exclusively to the review of both products and the retailers themselves. While such online reviews are often helpful, they can also be misleading due to the unknown relationship between the product being reviewed and the person writing the review. Thus, for example, a disgruntled buyer with an axe to grind against a seller might write a scathing review of an otherwise fine product. Conversely, an employee of a manufacturer might write a glowing review of that manufacturer's products, despite such products being sub-par. In short, online reviews have to be digested with a healthy dose of skepticism.

Another often difficult aspect of online retailing is keeping the product offerings and the data associated with each product accurate and current. Data associated with products, such as product specifications, product availability, price, etc., change frequently. This requires web sites displaying the products on the Internet to continuously update to match these changes, which is laborious and ongoing.

There remains a long-felt and unmet need to deliver current product information with accurate, third party reviews of the products and links to sellers who are offering the reviewed products.

SUMMARY OF THE INVENTION

The invention is directed to a blog-style buying guide application including a combination of both static and/or semi-static content and interactive, selectable, data-driven, dynamic content. The system generally includes an interactive product guide that has product options linked to a product database. The product database comprises product data organized in an ontology and a taxonomy. The product options dynamically switch from being available or unavailable for selection by a user depending on prior option selections by the user. Product data from the product database corresponding to products characterized by the selected options are presented to the user. Methods for using the system generally include presenting the system to a user for interaction therewith.

One of the systems of the invention comprises a product database and at least one interactive product guide accessible to a user. The product database is stored on a storage device and comprises an ontology and a taxonomy. The ontology comprises a plurality of items comprising product categories, product attributes, and product attribute values. The taxonomy comprises a hierarchical ordering of the plurality of items. Each interactive product guide comprises an option field and a results field. The option field presents a plurality of product options to the user. Each product option in the plurality of product options is linked to at least one item in the product database. The plurality of product options comprises a dynamically variable set of available product options available for selection by the user. Selection of one of the available product options generates a set of selected product options and a revised set of available product options. The revised set of available product options is defined with respect to the set of selected product options in accordance with the hierarchical ordering of the plurality of items in the product database. The results field presents at least one product result. Each presented product result comprises product data for a product characterized by the items in the database linked to the product options in the set of selected product options. Preferably, each product result comprises product data for a product characterized by the items in the database linked to the product options in the set of selected product options and further characterized by the items in the database linked to the product options in the revised set of available product options. The product data presented to the user preferably comprises one or more of a product image, a product name, a product manufacturer, a product retailer, product availability, product price, product dimensions, and product weight In some versions, each of the product options in the revised set of available product options is linked to items contained on a branch of the hierarchical ordering stemming from items linked to the set of selected product options.

In some versions, the plurality of product options comprises the dynamically variable set of available product options available for selection by the user in addition to a dynamically variable set of unavailable product options that are unavailable for selection by the user. Selection of one of the available product options generates the set of selected product options, the revised set of available product options, and a revised set of unavailable product options. The revised set of unavailable product options is defined with respect to the set of selected product options in accordance with the hierarchical ordering of the plurality of items in the product database. Each of the product options in the revised set of unavailable product options is preferably linked to items contained on a branch of the hierarchical ordering distinct from a branch stemming from items linked to the set of selected product options.

In some versions, the product data presented with the product result for a given set of selected product options is capable of being changed by modifying product data in the product database without changing the plurality of product options presented to the user and without changing the set of selected product options.

Some versions comprise a plurality of interactive product guides, wherein at least a first of the plurality of interactive product guides presents a product option linked to a first product category, at least a second of the plurality of interactive product guides presents a product option linked to a second product category, and the first product category and the second product category are non-overlapping categories.

Some versions comprise at least one an interactive product guide presenting a first product option linked to a first product category and a second product option linked to a second product category, wherein the first product category and the second product category are non-overlapping categories.

The system preferably comprises an author application configured for generating an interactive product guide. The author application preferably includes a functionality for searching the items in the database and/or a functionality for generating an option in the product guide that is linked to at least one of the items in the product database. The search item may comprise one or more of a search term and a product image.

One of the methods of the invention comprises a method for conveying product information with a system as described above or otherwise herein. The method may be implemented on a special-purpose computer or a suitably programmed general-purpose computer. The method comprises presenting the at least one interactive product guide accessible to a user for interaction therewith. Presenting the product guide comprises presenting the plurality of product options to the user. A set of selected product options and a revised set of available product options are generated upon selection of an available product options by the user. The revised set of available product options is defined with respect to the set of selected product options in accordance with the hierarchical ordering of the plurality of items in the product database. The method also comprises presenting at least one product result. Each product result comprises product data for a product characterized by the items in the database linked to the product options in the set of selected product options.

Some versions further comprise generating a set of unavailable product options upon selection of one of the available product options by the user. The set of unavailable product options is defined with respect to the set of selected product options in accordance with the hierarchical ordering of the plurality of items in the product database In some versions, each product result comprises product data for a product characterized by the items in the database linked to the product options in the set of selected product options and further characterized by the items in the database linked to the product options in the revised set of available product options.

Some versions comprise changing the product data presented with the product result for a given set of selected product options by modifying product data stored in the product database without changing the plurality of product options presented to the user and without changing the set of selected product options.

Some versions comprise presenting a plurality of interactive product guides, wherein at least a first of the plurality of interactive product guides presents a product option linked to a first product category, at least a second of the plurality of interactive product guides presents a product option linked to a second product category, and the first product category and the second product category are non-overlapping categories.

Some versions comprise presenting, in one of the at least one interactive product guide, a first product option linked to a first product category and a second product option linked to a second product category, wherein the first product category and the second product category are non-overlapping categories.

Some versions further comprise presenting an author application configured for generating an interactive product guide to a user for interaction therewith. The author application preferably comprises a functionality for searching the items in the database and/or a functionality for generating an option in the product guide that is linked to at least one of the items in the product database.

In some versions, one or more the sets of options described herein (e.g., product options, available product options, selected product options, unavailable product options, etc.) comprise at least one member.

The objects and advantages of the invention will appear more fully from the following detailed description of the preferred embodiment of the invention made in conjunction with the accompanying drawings.

BRIEF DESCRIPTION OF THE DRAWINGS

FIGS. 1-27 show screen shots of an exemplary implementation of the present invention.

FIG. 1 depicts a home page with a guide library for user access.

FIG. 2 depicts a portion of a web page of a snow blower guide accessed from the home page depicted in FIG. 1, showing displayed text in a text field.

FIG. 3 depicts an additional portion of the web page depicted in FIG. 2, showing an additional portion of the text field.

FIG. 4 depicts an additional portion of the web page depicted in FIGS. 2 and 3, showing an additional portion of the text field.

FIG. 5 depicts an additional portion of the web page depicted in FIGS. 2-4, showing available snow blower options.

FIG. 6 depicts the portion of the web page depicted in FIG. 5, showing product results resulting from a selection of the "Gas" option.

FIG. 7 depicts the portion of the web page depicted in FIGS. 5 and 6, showing product results resulting from a selection of the "Electric" option.

FIG. 8 depicts the portion of the web page depicted in FIGS. 5-7, showing the product results resulting from a selection of both of the "Gas" and the "Single Stage" options.

FIG. 9 depicts the portion of the web page depicted in FIGS. 5-8, showing the product results resulting from a selection of both of the "Gas" and the "Two Stage or Dual Stage" options.

FIG. 10 depicts an additional portion of the web page depicted in FIGS. 2-9, showing the product results resulting from the selections shown in FIG. 9 in addition to a selection of the "4 Cycle Engines" and the "Combined Manual and Electric Start" options.

FIG. 11 depicts an additional portion of the web page depicted in FIGS. 2-10, showing the product results resulting from the selections shown in FIGS. 9 and 10 in addition to a selection of the "Clearing Width 28" to 45"" and "Wheel Driven" options.

FIG. 12 depicts an additional portion of the web page depicted in FIGS. 2-11, showing the product results resulting from the selections shown in FIGS. 9-11 in addition to a selection of the "With Headlight(s)," "With Drift Cutters," and "Manual Chute Direction Control" options.

FIG. 13 depicts an additional portion of the web page depicted in FIGS. 2-12, showing the product results resulting from the selections shown in FIGS. 9-12 in addition to a selection of the "Horse Power 9 thru 20" and the "Tire Diameter 10" to 20"" options.

FIG. 14 depicts a pop-up window that appears when one of the product results in FIG. 13 is selected and the "General" button is selected.

FIG. 15 depicts the pop-up window depicted in FIG. 14 when the "Specs" button is selected.

FIG. 16 depicts a web page accessed by selecting the "About This Guide" button in FIG. 1.

FIG. 17 depicts the home page depicted in FIG. 1, showing a different array of guides.

FIG. 18 depicts a portion of a web page of a trailer hitch and accessories guide accessed from the home page shown in FIG. 17.

FIG. 19 depicts an additional portion of the web page depicted in FIG. 18, showing available trailer hitch and accessory options.

FIG. 20 depicts an additional portion of the home page depicted in FIG. 1, showing an author sign-in field.

FIG. 21 depicts a pop-up window that appears when the "Become a Guide Author" button shown in FIG. 20 is selected.

FIG. 22 depicts a web page accessed once an author signs in either in the "Author Sign-In" field shown in FIG. 20 or in the pop-up window shown in FIG. 21.

FIG. 23 depicts a web page accessed by clicking the "Save" button on the web page depicted in FIG. 22.

FIG. 24 depicts a pop-up window that appears when the "Add Product Finder" button on the web page depicted in FIG. 23 is selected.

FIG. 25 depicts a pop-up window that appears when a search result and the "Continue" button on the pop-up window depicted in FIG. 24 are selected.

FIG. 26 depicts a pop-up window that appears when the "Manage Sections" button on the web page depicted in FIG. 23 is selected.

FIG. 27 depicts a pop-up window that appears when the "Publish" button on the web page depicted in FIG. 22 or 23 is selected.

DETAILED DESCRIPTION OF THE INVENTION

Figure 1:

The present invention provides a system and method for accessing and presenting product data stored in a product database. The database preferably contains product data organized into an ontology and a taxonomy.

As used herein, "ontology" refers to a collection of product descriptors. Preferred product descriptors include product categories, product attributes, and product attribute values.

Product categories include the general descriptors for types of products. Examples of product categories include snow blowers, hitches, jewelry, cameras, vacation packages, etc. Some product categories may be distinct. Other product categories may be indistinct but may have different scope. Two product categories are considered to be distinct if they cannot be used to categorize the same product, i.e., they do not overlap in scope. Snow blowers and jewelry are examples of distinct product categories. Two product categories are indistinct if they can be used to categorize the same product, i.e., they overlap in scope. Jewelry and earrings are examples of indistinct product categories.

Product attributes include the types of qualities or characteristics of a product. Examples of the more common product attributes for material products include color, dimension (height, weight, depth,), mass, weight, and shape. Examples of attributes specific to a particular product include outer diameter and inner diameter for pipes, material type for bicycle frames, and others. Some product attributes, such as color, weight, and shape, are inherent to certain products, such as material products. Other product attributes, such as product manufacturer, product retailer, brand, product availability, and product price, are not inherent to certain products, such as material products.

Attribute values include the descriptors for the values of a product attribute. Examples of attribute values include the colors "red," "blue," "green," etc., for the attribute of color; "2.3 inches" for the attribute of outer diameter; "carbon fiber" for the attribute of bicycle frame material; "under $50" for the attribute of product price; and "no" or "not available" for the attribute of availability.

As used herein, "taxonomy" refers to an organization of the items of the ontology in a hierarchy. A preferred hierarchy takes the form of a branched tree comprised of parent nodes and child nodes. Each parent node comprises one or more child nodes branching therefrom, and each child node stems from a (preferably one and only one) parent node. The items of the ontology (e.g., product categories, product attributes, and/or product attribute values) preferably form the nodes of the tree. Each parent node characterizes the child nodes that branch therefrom. Conversely, each child node inherits the aspects specified in the parent node. Finally, child nodes stemming from the same parent node differ from each other by the characteristic specified in each respective node. It is preferred that the taxonomy takes the form of a rooted tree branching from the general to the specific and rooted with the most general item in the tree. The items of the ontology and taxonomy preferably remain in place as general descriptors whether or not the project database comprises product data instantiating each and every item.

In some versions of the invention, the taxonomy structures the items of the ontology in a frame/slot hierarchy. In a frame/slot hierarchy, the frames comprise the nodes of the tree, wherein each frame (except for the terminal frames) has child frames. Each frame also contains one or more slots. The frames are defined by general categories, and the slots are defined by particular values of the general categories. In certain versions of the invention, the frames may be defined by product categories and product attributes, while the slots may be comprised of "yes or no" answers to the product category frames and product attribute values for the product attribute frames. For example, a product category such as cameras and a product attribute such as price might constitute two frames in a frame/slot hierarchy. The values of "yes" might constitute a slot of the frame for the camera frame, and the values of "$300-500" or "$501-1000" might constitute the slots of the price frame.

It will be apparent to a practitioner in the art that the organization of items of an ontology in a hierarchy, such as a frame/slot hierarchy, is capable of automatically defining from a certain set of initially specified values both invalid items and valid items as possibilities in further characterizing a product. The valid items are the items corresponding to nodes that branch from the nodes corresponding to a most terminal (downstream) of the specified values, and the invalid items are the items corresponding to nodes that do not branch from the most terminal of the nodes corresponding to the specified values.

Various aspects ontologies into a taxonomies, including but not limited to such aspects as frame-based trees, frame/slot hierarchies, inferences derived therefrom, defining valid and invalid nodes, and differences between taxonomic (frame-based) inferences and rule-based inferences are described in U.S. Pat. Nos. 6,810,401; 7,219,100; 7,461,049; 7,805,461; 7,860,690; 7,869,981; 8,280,700; and 8,582,802 and US 2011/0085697, all of which are incorporated herein by reference in their entirety.

In addition to the product database, the system preferably further includes a product guide library accessible to a user. The product guide library comprises at least a consumer application accessible to a user. In preferred versions, the product guide library comprises both a consumer application in addition to an author application. The terms "consumer" and "author" in "consumer application" and "author application," respectively, are terms of convenience only. The terms serve merely to indicate that, during use, consumers will typically access and interact with the consumer application and product library authors will typically access and interact with the author application. The terms "consumer application" and "author application" do not imply that an application must be accessed by a consumer to be considered a "consumer application" or must be accessed by a library author to be considered an "author application." Instead, both the consumer application as well as the author application are preferably accessible to any user, whether the user is a consumer, a library author, an administrator, or any other individual interacting with the system. Accordingly, "user" as used herein broadly refers to both consumers and authors, among other types of users.

The consumer application portion of the product guide library comprises one or more—and preferably a plurality—of interactive product guides accessible to the user. In preferred versions of the invention, at least some, if not all, of the product guides are authored by one or more users using the author application, as described in further detail below.

As used herein, the phrases "product guide, "guide," or "buyer's guide" are used interchangeably and refer to an interactive presentation of text and/or graphical information and links relating to a given class of products, groups of classes of products, or even a project (such as how to paint a room or how to install a trailer hitch). Each guide includes a written, interactive tutorial that guides a user through the various options and product features that the user might find interesting. There is no specific format a guide must take. For example, it can begin with a text description of the subject matter, and then conclude with a series of questions and corresponding option buttons, or the guide may have questions and option buttons interspersed throughout the narrative text. In either instance, the ultimate outcome of each guide is that the user is presented with one or more products that are likely to meet the buyer's needs. The products are then presented along with detailed product information about the displayed product, as well as where the product can be purchased.

Of critical note is that the data concerning each product is not typically provided by the author. (This process will be described in greater detail below.) Instead, the guide author links the options in the guide to the items in the product database in order to display relevant products and the product data corresponding to the products. Thus, the items (color, size, configuration, horsepower, voltage, etc., i.e., whatever physical qualities or other descriptive data that are used to define a given product) are already contained within the pre-existing database having the pre-defined product ontology and taxonomy. The guide author uses the authoring tool (described below) to link the guide to the relevant items in the pre-existing database. The author is not required to provide any additional product data to the guide because the product database is populated with almost every useful metric on any given product. However, in some versions, the author may include within a guide any additional product data that might be helpful in making an informed purchasing decision, and which data are not included in the existing product database(s) being accessed by the program.

The types of products covered by the product guides may include material products, such as hammers or snow blowers, or non-material products, such as vacation packages or airfare packages. Each individual product guide may be directed to any single type of product (e.g., tents, sleeping bags, or dehydrated foods) or groupings of different types of products (e.g., tents, sleeping bags, and dehydrated foods). The groupings of different types of products may be unified by a user activity or theme. For example, a single product guide may be directed to different types of products falling under the theme of camping, such as tents, sleeping bags, and dehydrated foods.

A product guide directed to a single type of product pertains to branches of the taxonomy stemming from a single product category. This is the case even if that product category branches into more narrowly defined indistinct product categories and/or different attributes and attribute values. Thus, a product guide directed to automobiles that provides cars as an option and red cars as a further option is considered to be directed to a single type of product if the database comprises nodes for red as an attribute value for cars and cars as a sub-product category of automobiles in its taxonomy.

A product guide directed to a grouping of multiple types of products pertains to branches of the taxonomy independently stemming from multiple, non-overlapping categories. "Non-overlapping categories" refers to categories that do not overlap in scope, i.e., they exist in the taxonomy on parallel branches and are therefore not disposed upstream or downstream of each other on the same branch. A guide directed to branches of the taxonomy independently stemming from multiple attributes and/or attribute values does not constitute a grouping of multiple types of products, provided that the attributes and/or attribute values all stem from the same product category node. Thus, a product guide directed to tents, sleeping bags, and dehydrated foods is considered to be directed to multiple types of products if they do not stem from a single product category in the taxonomy.

The product guides may be provided to the user by any number of ways, including a listing of the guides and/or through access via a search portal. The listed product guides may be listed in alphabetical order or may be grouped in themes, such as the newest product guides to the library, the top-rated guides in the library, featured guides, product categories (e.g., construction tools, swimming attire, etc.), or activity themes (e.g., camping, cycling, hunting, etc.). The search portal may be configured to employ any of a number of search terms, including characters, words, phrases, or images. The search terms are used by the search portal to identify the product guides comprising the same or similar terms therein and present such product guides to the user. Exemplary methods for searching using a search image are described in U.S. Pat. No. 8,582,802 and US 2011/0085697, which are incorporated herein by reference.

The product guides themselves are configured to present one or more—and preferably a plurality—of product options to the user for selection. The product options may be presented in a field, such as an option field. Each of the product options in the product guide is linked to an item (e.g., product category, product attribute, and/or attribute value) in the product database. The linkage is such that selected options in the product guide correspond to activated items in the database and that valid and invalid items in the database correspond to available and unavailable options, respectively, in the product guide. For example, selection of a given option in the product guide identifies the corresponding item in the product database as an activated item. From the activated item, an inference is made that identifies the valid items and the invalid items based, at least in part, on the taxonomic structure of the product data in the database. In some versions, the valid items are those that are downstream (e.g., in the direction of further specificity) of the most terminal of the activated items in the taxonomic structure, and the invalid items are those that are not downstream of the most terminal of the activated items in the taxonomic structure. In other words, the invalid items are those that are on separate branches than the activated and valid items in the taxonomic structure. In other versions, the valid items are those that are downstream of the most terminal of the activated items in the taxonomic structure and have product data associated with them, and the invalid items are those that are not downstream of the most terminal of the activated items in the taxonomic structure as well as those that are downstream of the most terminal of the activated items in the taxonomic structure and do not have product data associated with them. Once an identification of the valid and invalid items is made, the options corresponding to the valid options remain as available options in the product guide, and the invalid options become unavailable options. The available options are available for selection by the user, and the unavailable options are unavailable for selection by the user. If the user selects another of the available options, a revised set of available product options is generated, and a revised set of unavailable product options is generated, again, by virtue of the linkage of the product options to the items in the taxonomy and the inferences regarding the valid and invalid items based on the structure of the taxonomy. This process can be repeated until all available options are exhausted.

Figure 26:
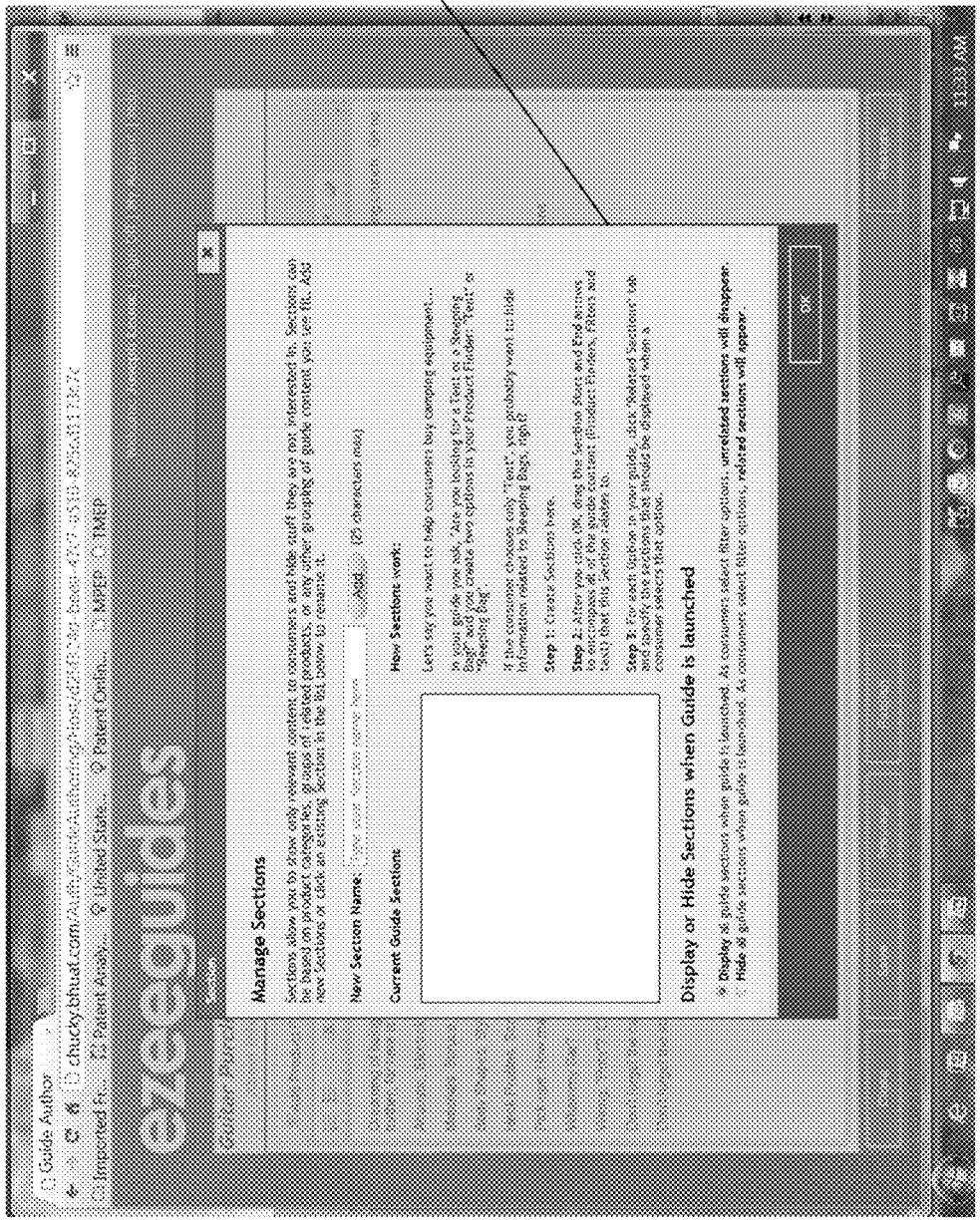
Figure 27:
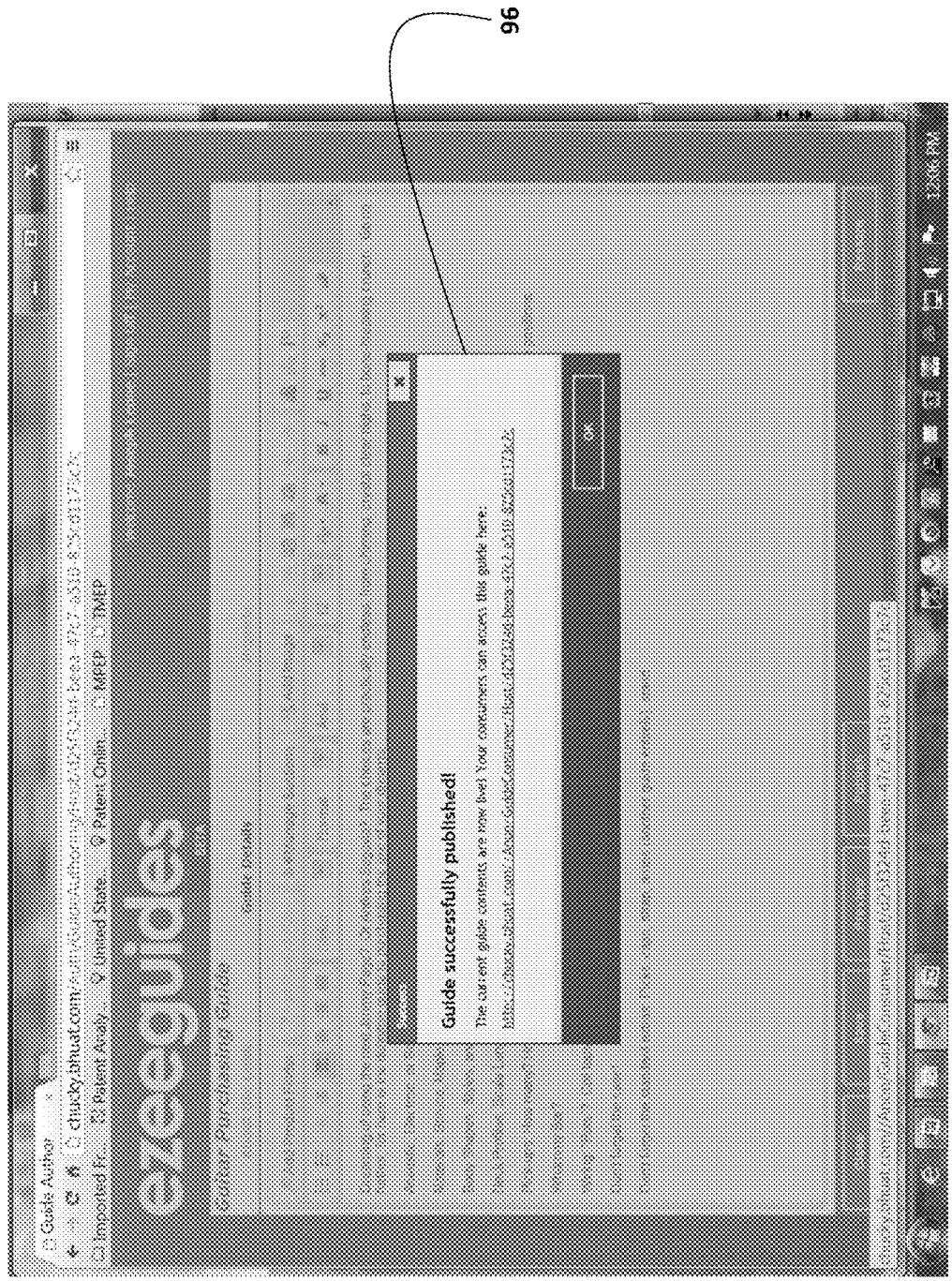

The product options may be presented in any of a number of formats, including text, images (e.g., picture of a product or attribute), or a combination of both. The product options may be presented in any of a number of arrangements. For example, the available options may be presented in subsets, with each additional presented subset comprising available options as dictated by the options that are selected in the initial presented subset. Alternatively, all the available options may be simultaneously presented, and as the user selects the available options, the options that become unavailable progressively disappear from the field or become indicated as unavailable. Exemplary indications of unavailability may include dimming or shading of the presented options or marking the presented options with an "x," etc. It is preferred that the selected options are marked with some cue, preferably a visual cue, that identifies them as such. Exemplary cues include circles or boxes that surround the selected options. Any descriptive text associated with the options may appear or disappear as the associated options appear or disappear. The appearance and disappearance of certain options and associated text can be defined by the author as sections pertaining to certain other options, as described in further detail below and as shown in FIG. 26.

Thus, the product guides are dynamic in that the selection of particular options dynamically changes the options available to the user for selection. It is preferred (although not required) that the guides update in response to the user's selections without reloading the guide or linking to another page.

In addition to presenting the product options, the product guides are also configured to present product data corresponding to products characterized by the selected product options. By virtue of the preferred tree structure, the presented product data also includes product data corresponding to products characterized by the valid options. The product data may be presented in a field, such as a result field. The presented product data may comprise any datum or data associated with the product characterized by the valid option. For example, the presented product data may include any item description (e.g., product category, product attribute, and/or attribute value) in the product database characterizing the products, or any other data associated with the products, including product images, product names, product manufacturers, product retailers, availability, price, dimensions, and weight. The presented product data is preferably organized such that the product data corresponding to the same product are grouped together. Each grouping of data is referred to herein as a "product data unit."

The product data may be presented in any of a number of arrangements. In one version, product data corresponding to all items covered in the product guide are initially presented, and the initially presented data are progressively removed as the user selects options that generate invalid items in the database. In another version, product data is presented only after making an initial option selection, and, as above, the presented data are progressively removed as the user selects options that generate invalid items in the database. The product data is preferably presented and removed as product data units.

The product guide preferably has a functionality by which selecting a datum of the presented product data, such as a product data unit, presents further data on the product. The further data may include at least general information about the product, specifications of the product, product price, product retailer(s), and product availability. Selecting a datum of the presented product data, such as a product data unit, may also or alternatively be associated with a functionality for purchasing the product.

Although linked via the product options and database items, the product guides and the product database are each individual, distinct structures. This provides for the opportunity to make changes to the presented product data for a particular product without changing the format or content of the product guides themselves. For example, if a particular product changes manufacturers from Company A to Company B, this change can be updated in the product database without making changes to the presented options or any other aspect of the product guide. When a user selects options that would previously result in Company A being presented as the manufacturer in the presented product data, the selections would now result in Company B being presented. Similarly, if a particular product represented in the product database is no longer available, the data corresponding to the product can be removed from the database. When a user selects options that would previously result in the data corresponding to that product being presented in the presented product data, the selections would now result in that data not being presented. Finally, if a particular product not represented in the product database becomes available, the data corresponding to the product can be added to the database. When a user selects options that previously did not result in the data corresponding to that product being presented in the presented product data, the selections would now result in the data being presented. This functionality is made possible by the ability to modify the data instantiating the ontology and taxonomy without modifying the ontology and taxonomy itself.

The author application portion of the product guide library comprises functionalities for a user to generate product guides within the product guide library. The author application preferably provides functionalities for generating certain content and structure of a product guide that is independent of the ontology or taxonomy of the product database. See, e.g., FIGS. 22-23, described in further detail below. Such functionalities may include functionalities for naming the guide, providing a brief description of the guide, and providing an image to be associated with the guide. The name, description, and image generated by the user may be presented alongside the names, description, and images of other guides comprised within the product guide library for access by a user. Another functionality preferably includes a word-processing functionality. The word-processing functionality preferably provides for inputting text to be displayed within the guide. The word-processing functionality may comprise any of the common word-processing commands or options known in the art, including font type, font size, boldface, italics, underline, superscript, subscript, strikethrough, text alignment formatting, etc.

The author application further provides functionalities for generating certain content and structure of the product guide that is linked to the ontology or taxonomy of the product database. See, e.g., FIGS. 24-26. Such functionalities may include functionalities for searching the items in the product database, and generating options in the product guide that are linked to one or more particular items in the product database. The functionality for searching the items may search the product database using any type of search term, including characters, words, phrases, or images. Exemplary methods for searching using a search image are described in U.S. Pat. No. 8,582,802 and US 2011/0085697, which are incorporated herein by reference. The functionalities for generating the options may include functionalities for labeling the options, describing the options ("help text"), and providing images representing the options. The functionalities for generating the options may also include functionalities for presenting or hiding certain options or sections of the product guide depending on the options selected by the user.

By permitting the author application to provide functionalities for generating content and structure of a product guide that is independent of the product database as well as content and structure that is linked to the product database, the resulting product guides may have a mixture of static content and dynamic content, with the dynamic content being dictated by the selections of the user in combination with the ontology and taxonomy of the product database. The static content may comprise the text and images added to the product guide that are independent of the product database, and the dynamic content may comprise the presented product options and the presented product data resulting from the user's selection of the presented product options.

A key advantage to authoring product guides in this fashion is that the product information is already contained in the existing database and organized in ontologies and taxonomies. This relieves the author from the need to provide his or her own product data when generating the guide. Furthermore, the author does not have to update the guide as the product data in the product database changes. That static content, as well as the displayed options, can remain the same despite any changes to the product database; it is only the presented product data and the partitioning of the options as either available or unavailable that may change as the information in the product database changes. In other words, by actively linking the guide content to categories, attributes, and values within the existing database, the guide is automatically updated as the corresponding product information database is updated.

While it is contemplated that most guides will be authored by consumers, it need not be so limited. For highly complex areas with many variables, a professionally drafted guide could prove to be a powerful marketing tool. Thus, it is envisioned that product guides can be commissioned—either by manufacturers or retailers. The guides provide opportunities for authors to present accurate and unbiased opinions that present both the author's expertise in a given area and the author's impression of the products available within a given category.

An exemplary version of the system and method of the present invention is shown in FIGS. 1-27. Where possible, the same reference numerals are used throughout the figures to designate the same element.

Referring now to FIG. 1, the figure depicts an exemplary home page of a guide library according to the present process. The physical lay-out of the page is exemplary only. The actual "look and feel" of the home page can vary depending upon the whim and fancy of the designer. As shown, the home page has a field 12 that depicts a number of guides that are available for review. A guide 20, describing snow blowers, will be used as an example to describe the basic functionality of the process. Also included above the field 12 are a series of typical buttons that sorts the available guides by featured guides, top-rated guides, and newest guides. Also included is a link 16 that links the user to a highlighted guide. (As shown in FIG. 1, the link 16 connects the user to the guide 20 relating to snow blowers, which is described in detail in FIGS. 2-15). Button 14 links the user to a short description about a highlighted guide, with optional information regarding the author of a guide. Field 18 is a general field to include any kind of announcements or miscellaneous new or information regarding the guides. At the top right corner of FIG. 1 are two typical links found on most websites: a "home" button, and an "about" button. Also included is a "Guides Authoring" button 17, which will be described below with respect to the authoring functionality of the process. Finally, a search button 15 for searching the guides in the library is also included.

FIG. 1, when field 20 is highlighted (e.g., by clicking on the field 20) and button 16 is pushed, the user is led to a buying guide for snow blowers, as depicted in FIGS. 2-16. As noted above, this is simply an exemplary guide to illustrate the process. As can be seen in FIG. 1, there are other guides, such as a "Door Guide" and a "Selecting a Home Theater Projector Guide." The features described with respect to the snow blower guide may be implemented in any other guide for any other good or service.

Figure 2:
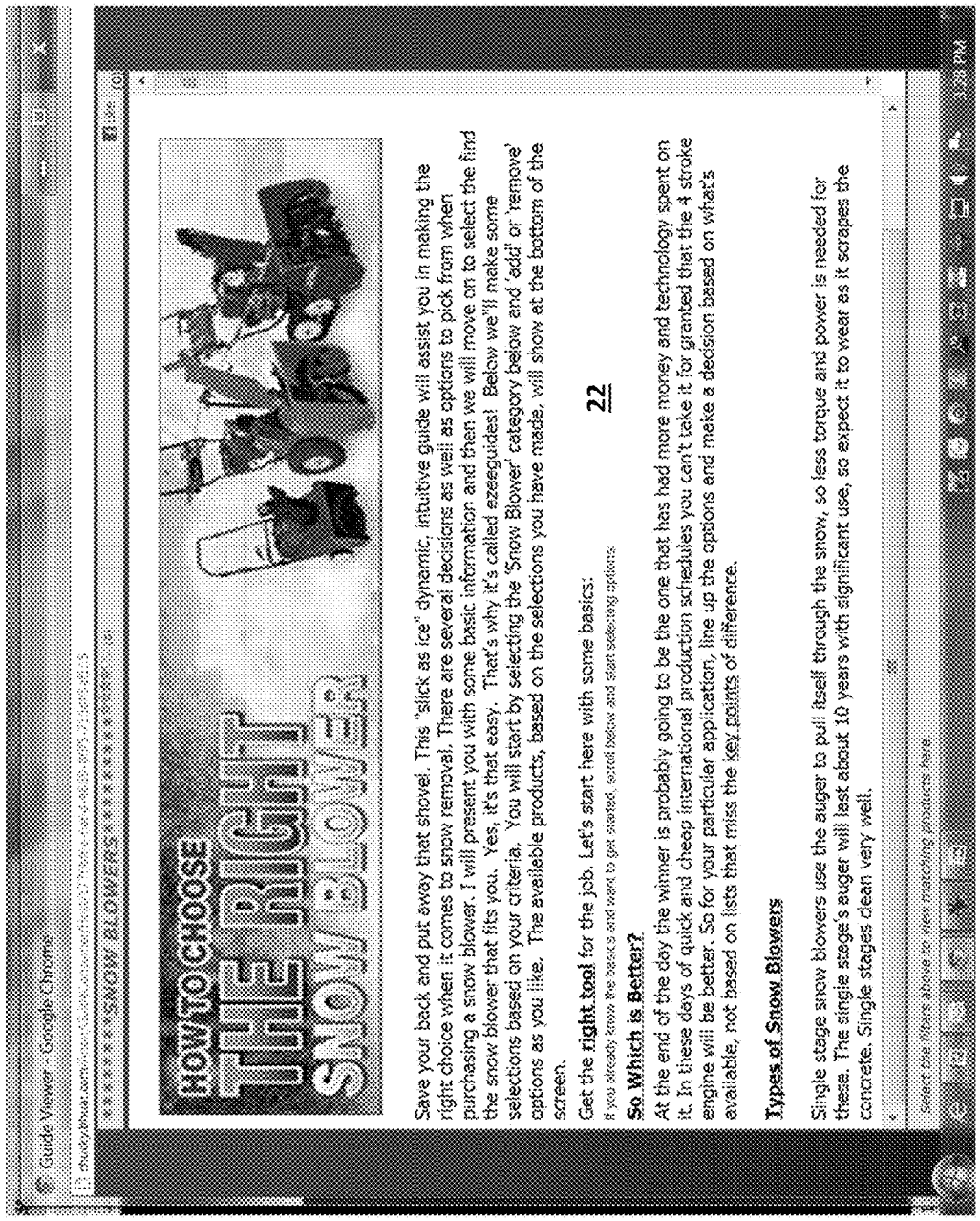
Figure 3:
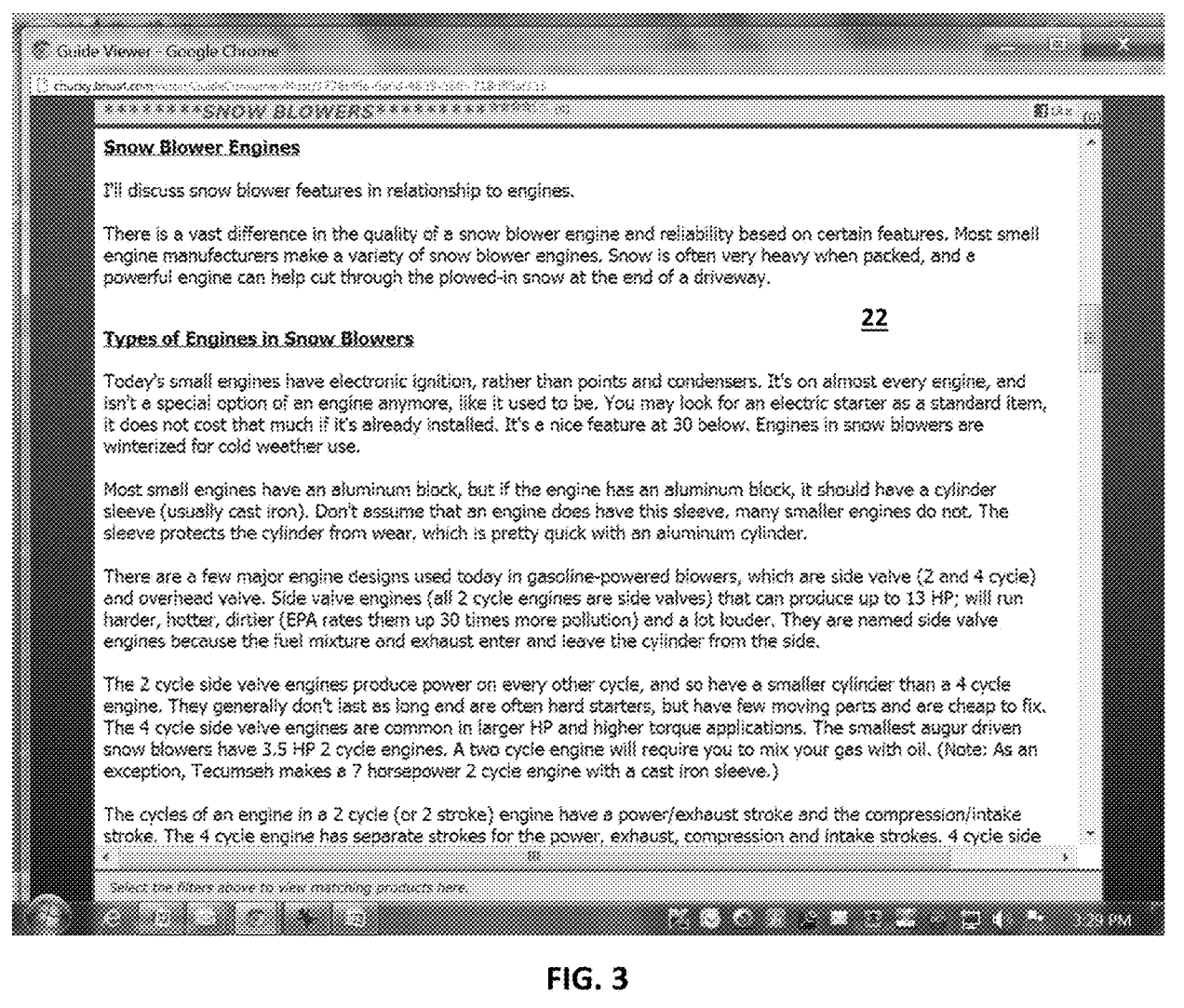
Figure 4:
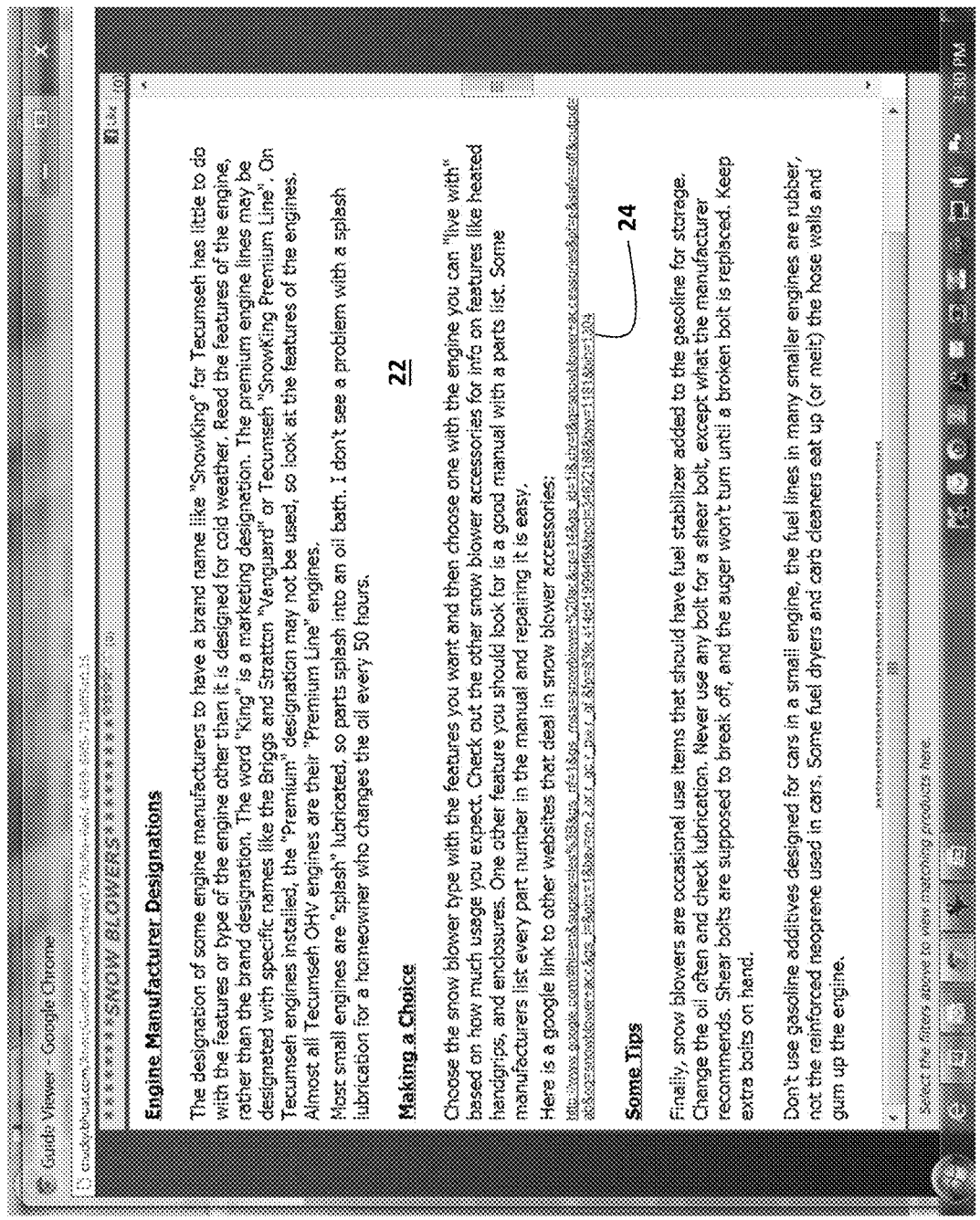

Referring now to FIGS. 2-4, these figures include a text field 22 in which the subject at hand is described in whatever detail the author deems appropriate and helpful. As noted in the middle of FIG. 2, near the reference numeral 22, the purpose of the guide is to help the user purchase the right tool for the job—i.e., a snow blower that will meet the buyer's needs, budget, etc. Moving through FIGS. 2, 3, and 4, the guide provides narrative guidance and information on the types of snow blowers, the types of engines found in snow blowers, engine manufacturer designations, etc. FIG. 4 illustrates that the guide may contain links 24 to outside sources to present additional information. In the case of link 24, it is a link to other websites that address accessories for snow blowers.

Figure 5:
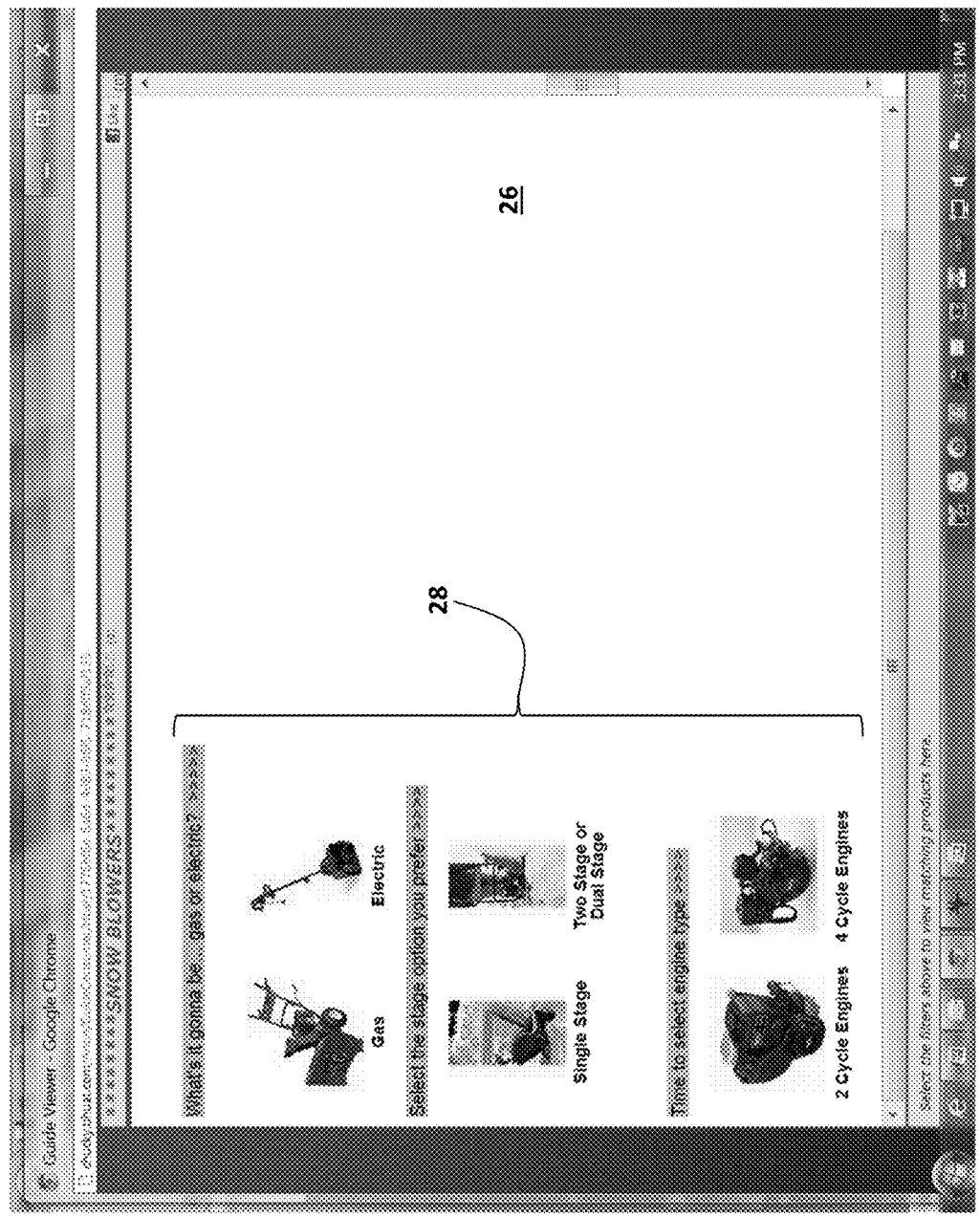

An interactive portion of the snow blower guide is depicted in FIGS. 5-13. Here, the shopper is presented with a series of interactive options for selection by the user. The options are presented as selectable buttons, which can be selected by clicking on the buttons. The options selected by the user dictate the types of snow blowers that are ultimately presented to the user such that the presented snow blowers each comprise the options selected by the user. Thus, as shown in FIG. 5, the user is presented with a series of options in field 28. Field 28 shows the first three snow blower options, none of which are selected in FIG. 5: gas or electric motor, single-stage or dual-stage design, and two-cycle or four-cycle engine. No products are shown in FIG. 5 because the user has not selected any of the options. Field 26, which is empty in FIGS. 5-13, may contain additional information, such as sub-types, or other choices that may arise in response to choices made by the user in any of the specific buttons found in field 28.

Figure 6:
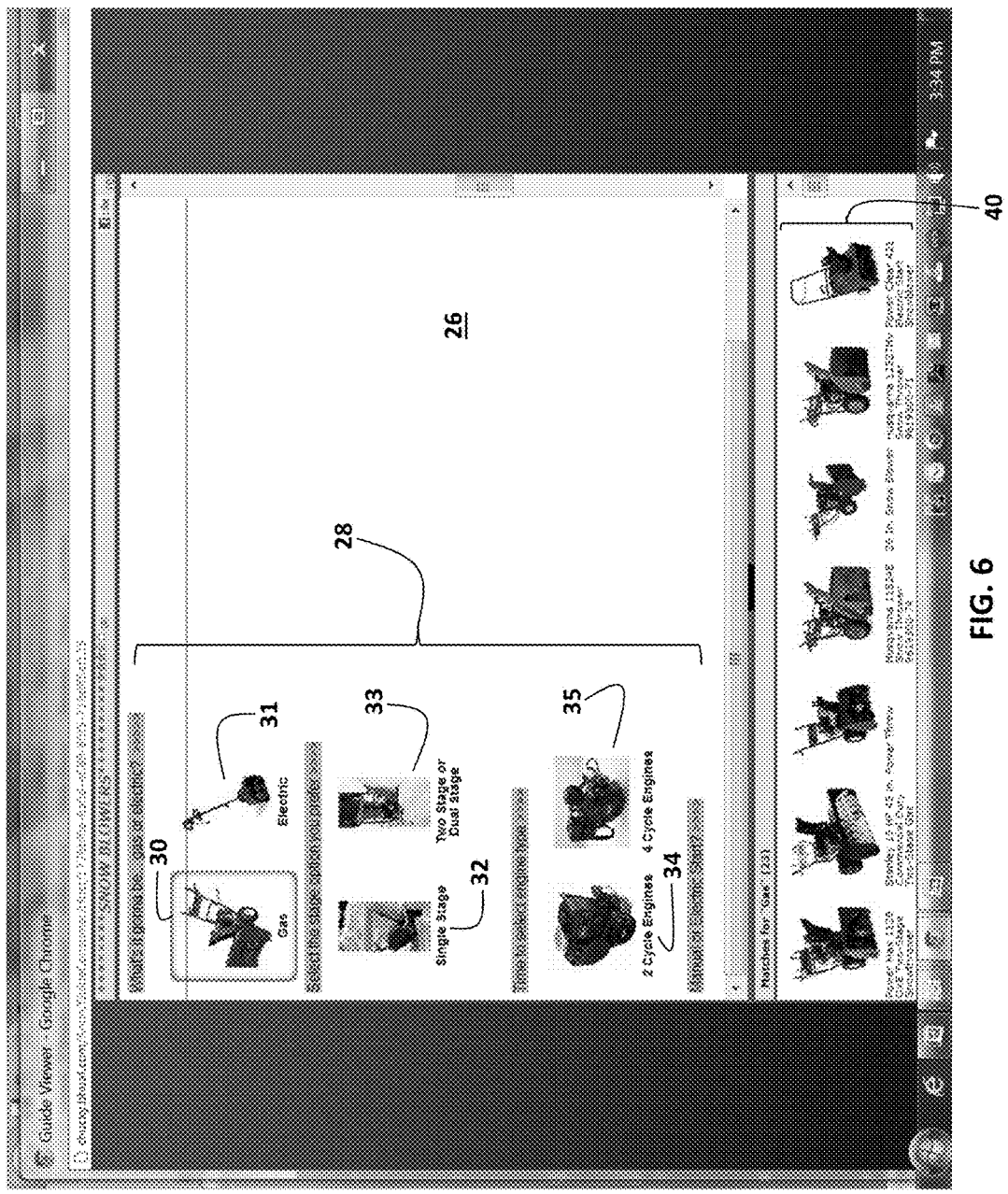

In FIG. 6, the various product options within field 28 are numbered. The product option buttons depicted are gas engine 30 or electric engine 31, single-stage design 32 or dual-stage design 33, and two-cycle engine 34 or four-cycle engine 35. The gas engine option 30 ("Gas") is selected as shown by the square around it. Unlike FIG. 5, FIG. 6 also includes a results field 40. Because the gas engine option 30 has been selected, results field 40 now displays all of the gasoline-powered snow blowers that can be purchased by participating retailers. At point, the user could simply stop with this single selection, browse all of the gas-powered snow blowers available, and make a purchase based solely on that one criterion (gas-powered engine).

Figure 7:
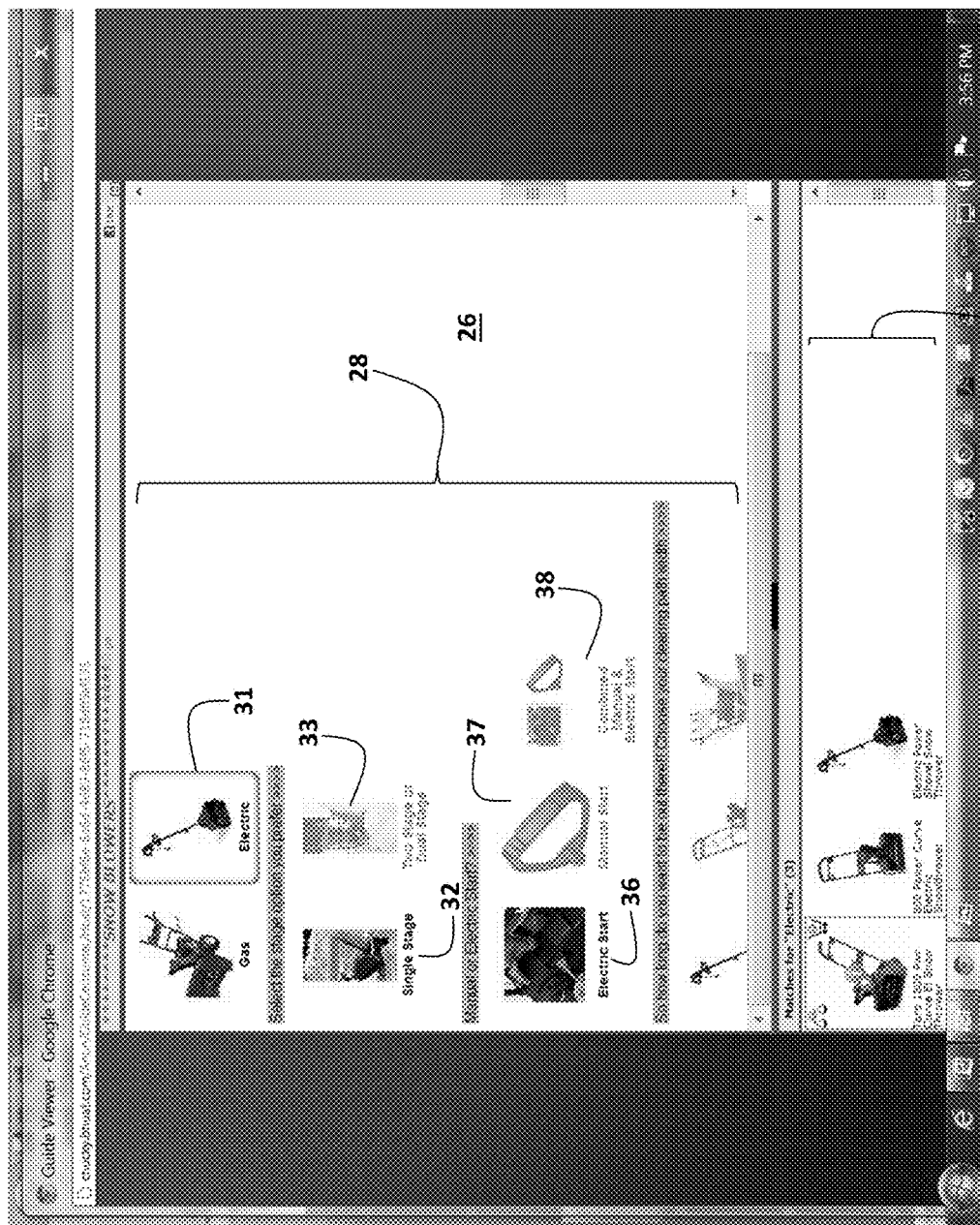

Comparing FIG. 7 to FIG. 6 illustrates the interactive nature of the buying guide. In FIG. 7, the user has selected the electric engine option 31. Note that the remaining product options have changed as a result of the initial selection of option 31, as have the available products depicted in the results field 40. As shown in FIG. 7, the dual-stage option 33 is now dimmed—indicating there are no electric-powered, dual-stage snow blowers available. Thus, option 33 is presented as unavailable in response to the selection of option 31. In this fashion, the user does not waste time trying to find a two-stage electric snow blower. FIG. 7 also shows that the 2 cycle engine option 34 and the 4 cycle engine option 35 of FIG. 6 no longer appear, indicating that these options are not available with the selection of the electric engine option 31. FIG. 7 also shows additional options, namely electric start 36, manual start 37, and combined manual and electric start 38. Again, note that options 37 and 38 are dimmed indicating they are unavailable in response to the user having selected option 31. Because the user has selected option 31 (which is electric start), the engine is (by definition) "electric start" as depicted in option 36, which is the only available option now remaining in that row of options.

Figure 8:
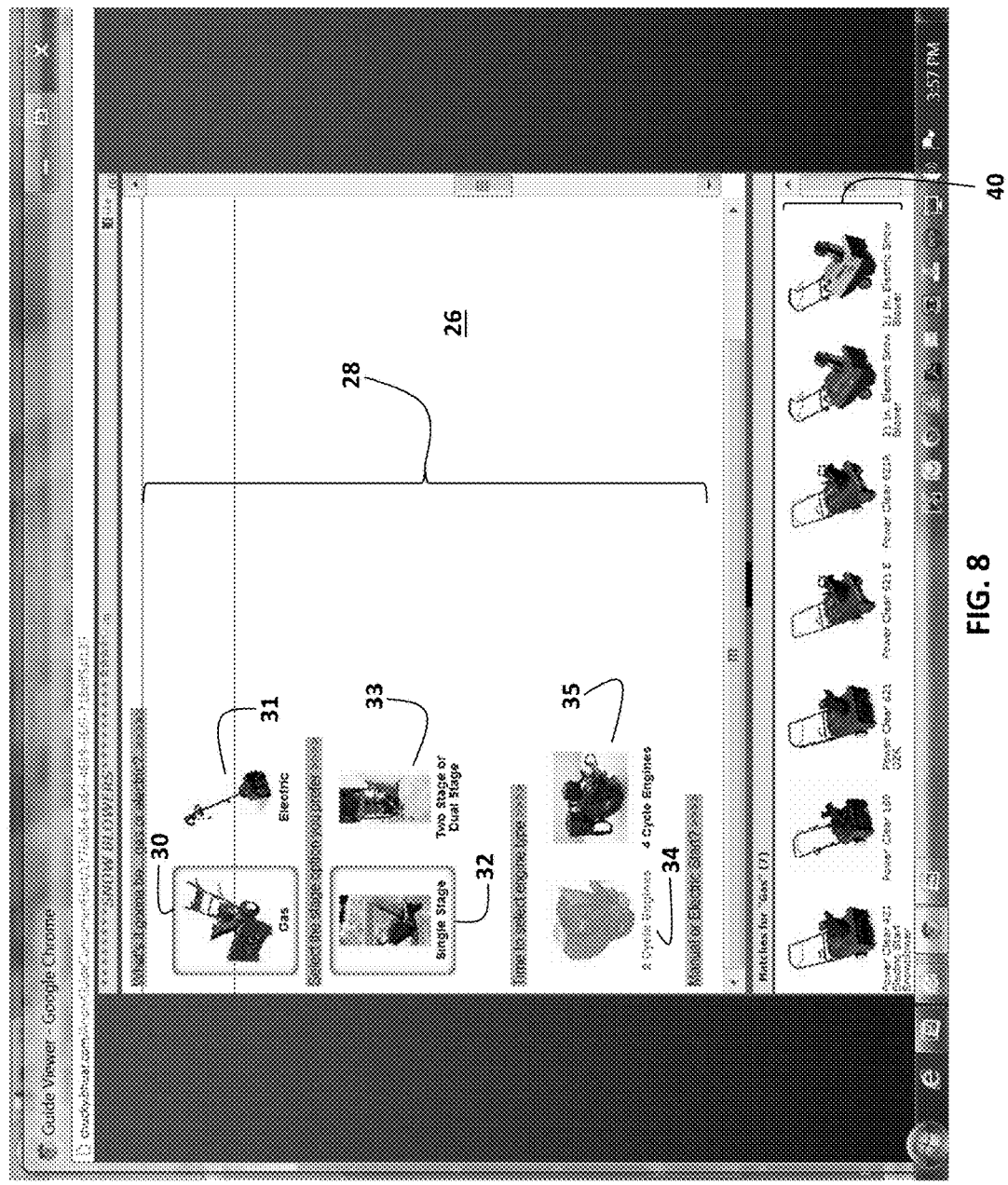
Figure 9:
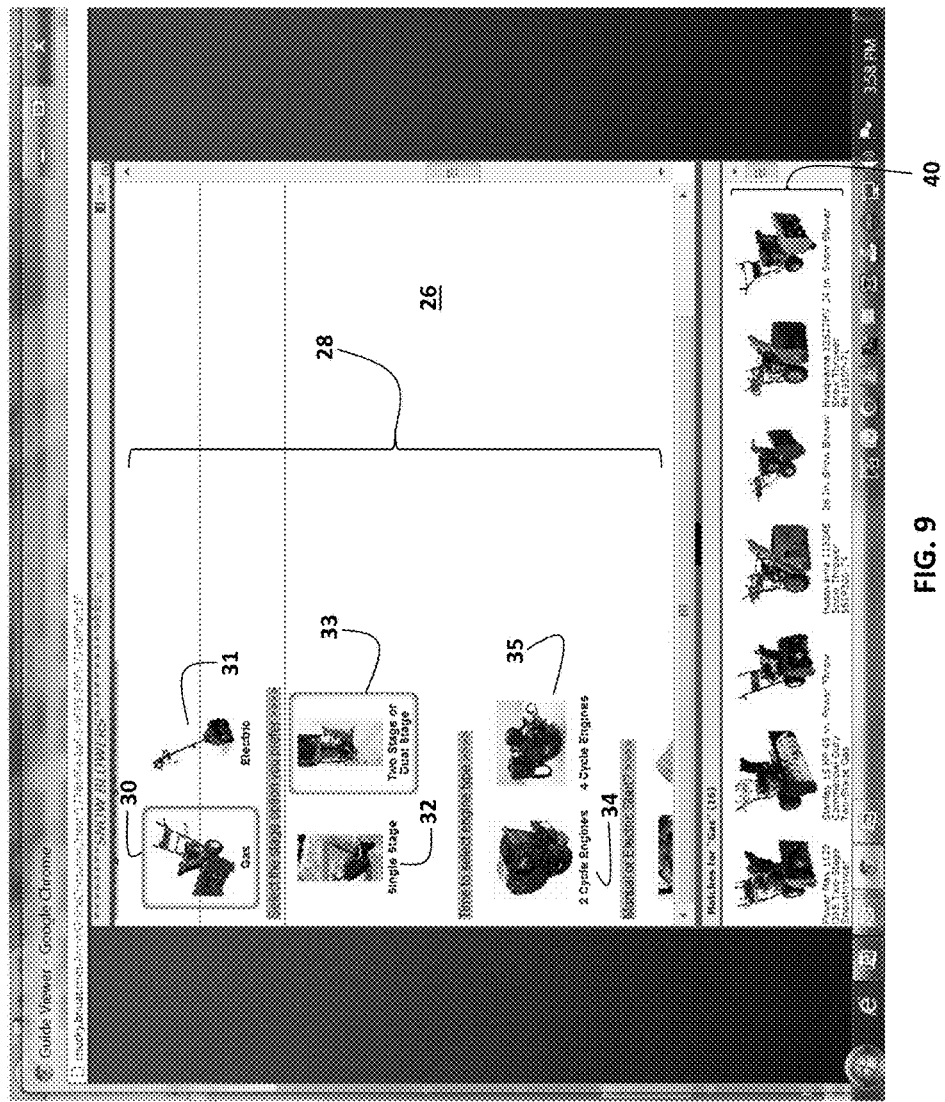

FIG. 8 further depicts the interactive nature of the various options in field 28 and how they can be used to browse and filter the product offerings in the database and present the results in field 40. In FIG. 8, the gas-powered engine option 30 is selected, as is the single-stage option 32. In response, the 2-cycle engine option 34 is shown as unavailable. Thus, at present, all available gas-powered, single-stage snow blowers are powered by a four-cycle engine, which is shown in option 35. Note that option 35 has not been actively selected, but because it is the only option remaining in that attribute classification (2-cycle vs. 4-cycle), the results field 40 present snow blower products that are all gas-powered, single-stage, and powered by a four-cycle engine. FIG. 9 is identical to FIG. 8, but shows what happens when the dual-stage option 33, rather than the single-stage option 32, is selected. As shown in the figure, gas-powered, dual-stage snow blowers do come with either a two-cycle engine 34 or a four-cycle engine 35. If the user wishes to limit resulting products to one or the other, only one of options 34 or 35 can be selected. As shown in FIG. 9, neither of buttons 34 or 35 is selected. Thus, the results field 40 depicts all available snow blowers that are gas-powered, dual-stage, and powered by either a two-cycle engine or a four-cycle engine. Note that product selections depicted in results field 40 in FIG. 9 are different from those in FIG. 8.

Figure 10:
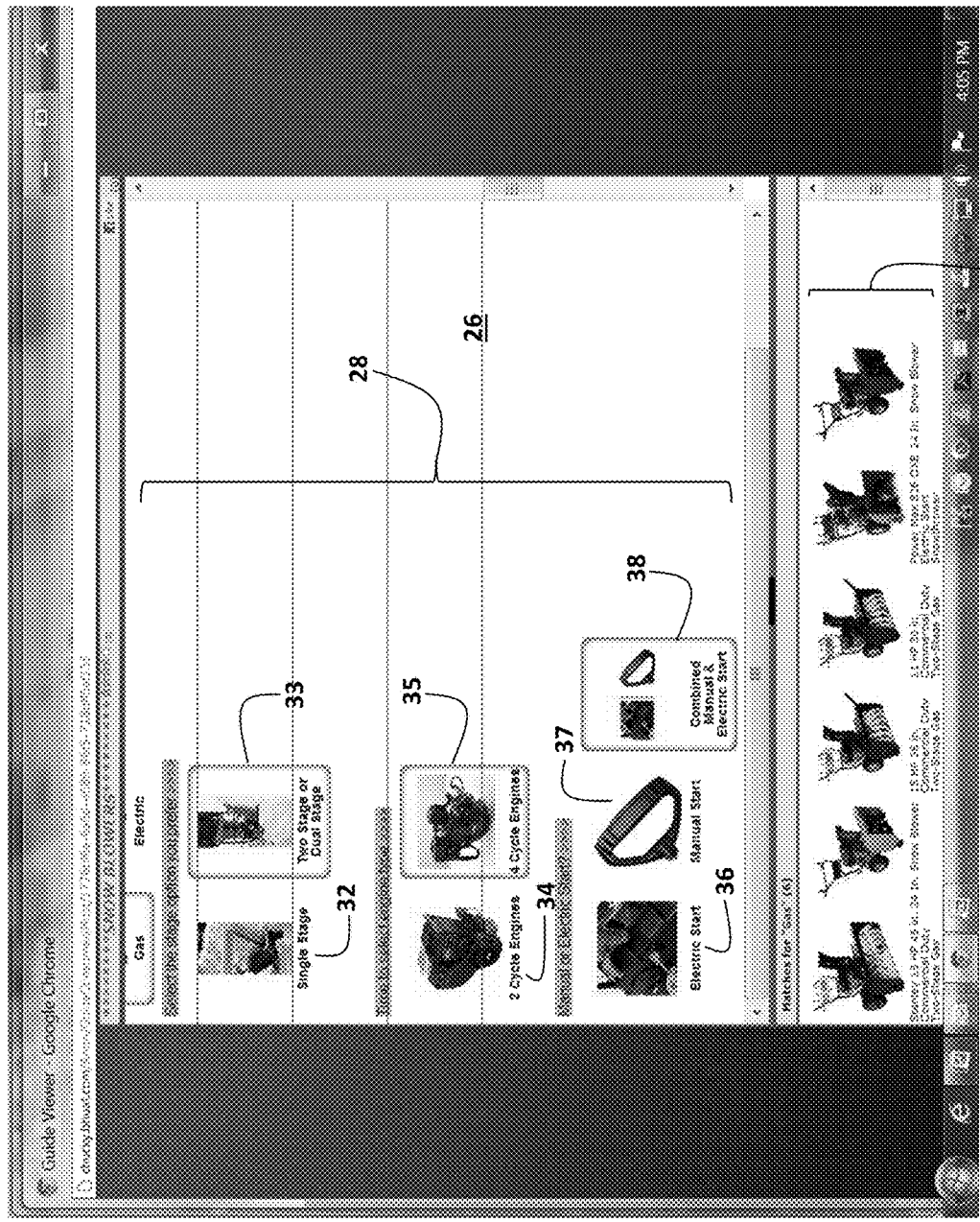

FIG. 10 is identical to FIG. 9 except that each of the dual-stage option 33, the four-cycle engine option 35, and the "combined manual & electric start" option 38 is selected. Thus, in FIG. 10, the results field 40 shows all available snow blowers that are gas-powered, dual-stage, powered by a four-cycle engine, and have combined manual & electric start. The results shown in field 40 of FIG. 10 change as compared to FIGS. 8 and 9 accordingly.

Figure 11:
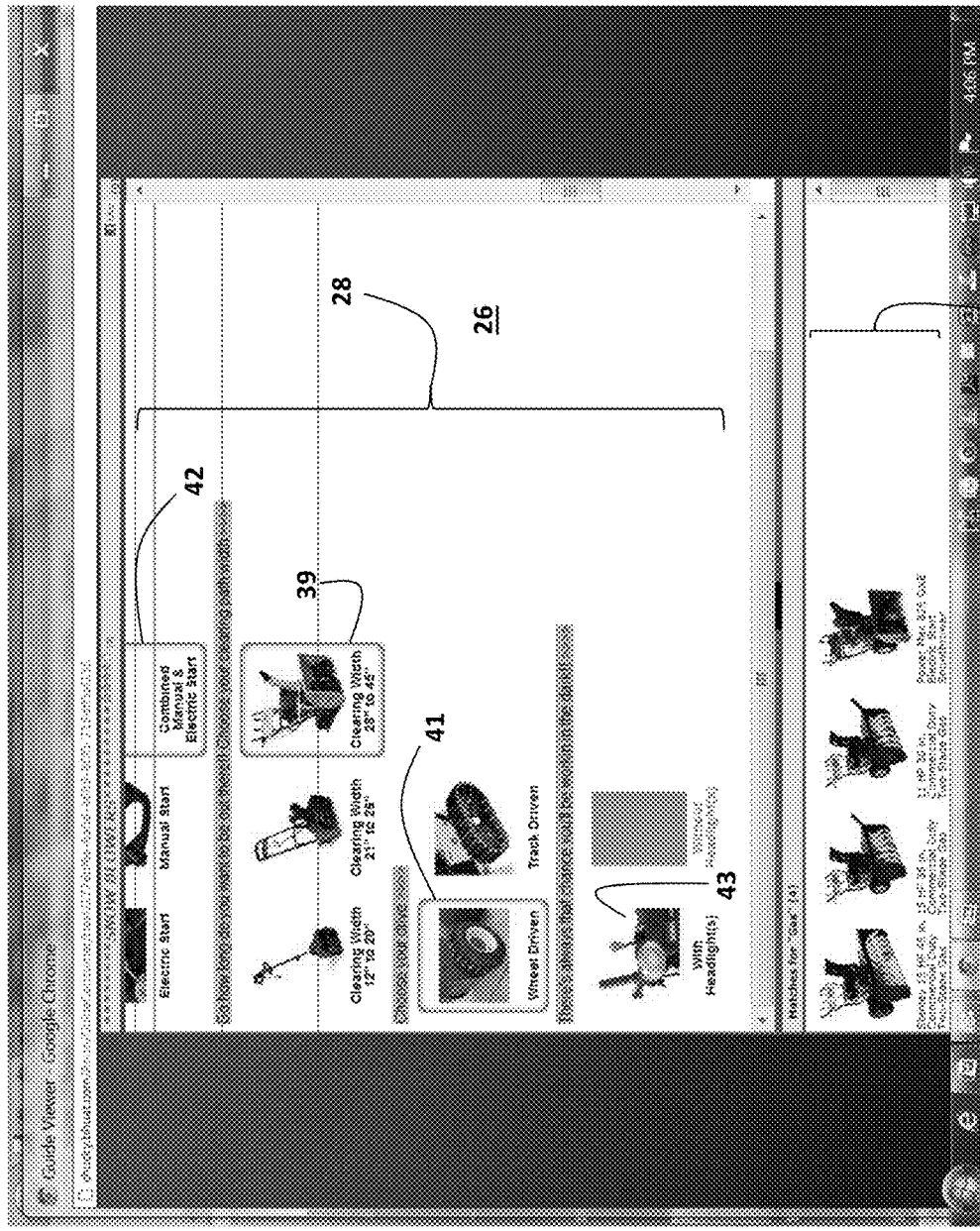
Figure 12:
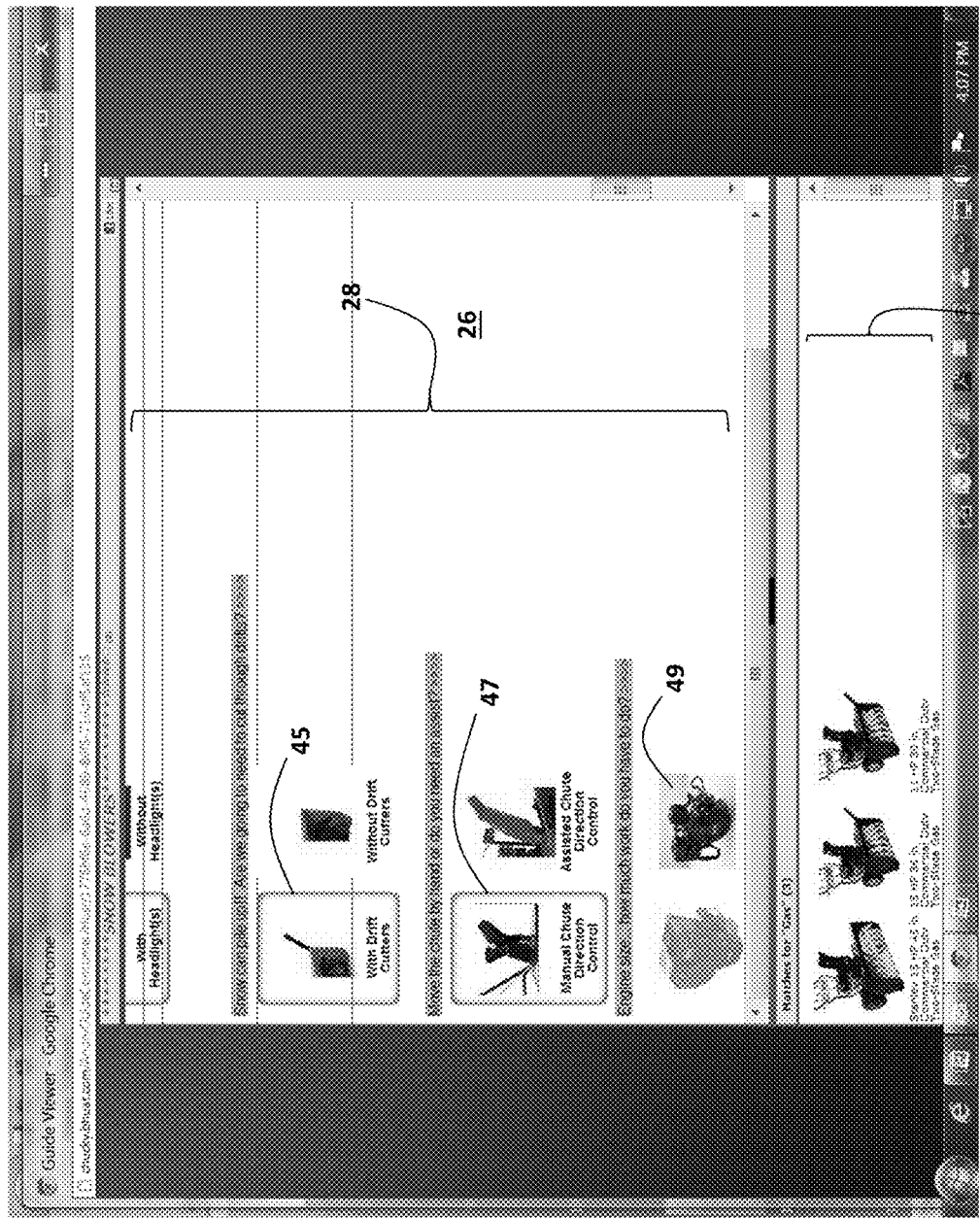
Figure 13:
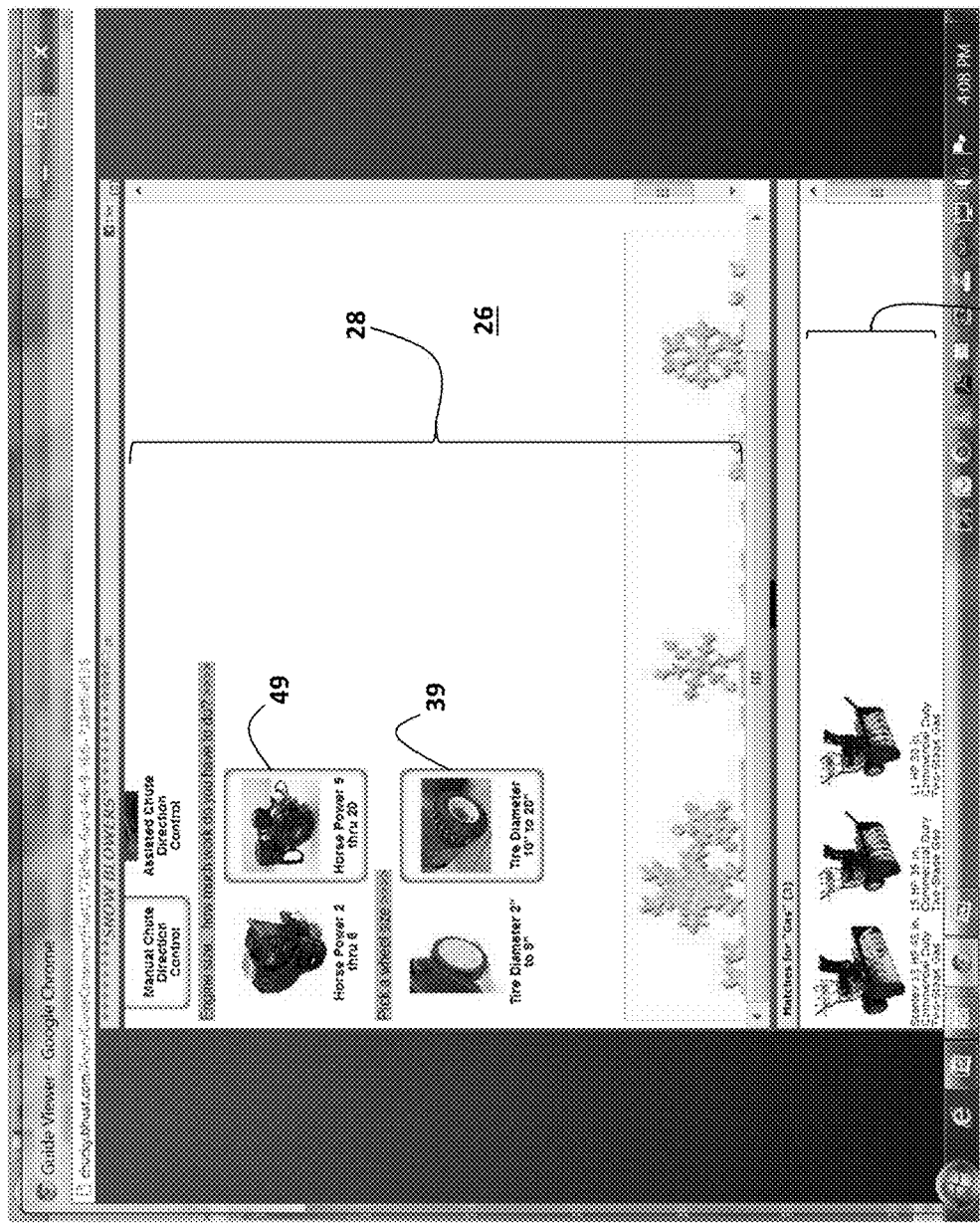

FIGS. 11, 12, and 13 depict variations on the above process, with additional options that can be selected. In FIG. 11, the option selections are combined manual and electric start (option 42, partially obscured at the top of the figure), clearing width 28 inches to 45 inches (option 39), wheel-driven (option 41) and with headlights (option 43). The "without headlights" option is presented as unavailable. Thus, all available snow blowers in this configuration have headlights. As shown in field 40, there are four current snow blowers that meet the selected criteria. FIG. 12 is the same as FIG. 11, but adds still more criteria by selecting the options for with drift cutters (option 45) and with manual chute direction control (option 47). The product selection displayed in field 40 has dropped to three machines meeting all of the specified criteria. FIG. 13 is the same as FIG. 12, but with two additional criteria selected: horse power 9 thru 20 (option 49) and tire diameter 10 inches to 20 inches (option 39). These additional selections, however, did not alter the available products with respect to those shown in FIG. 12.

Figure 14:
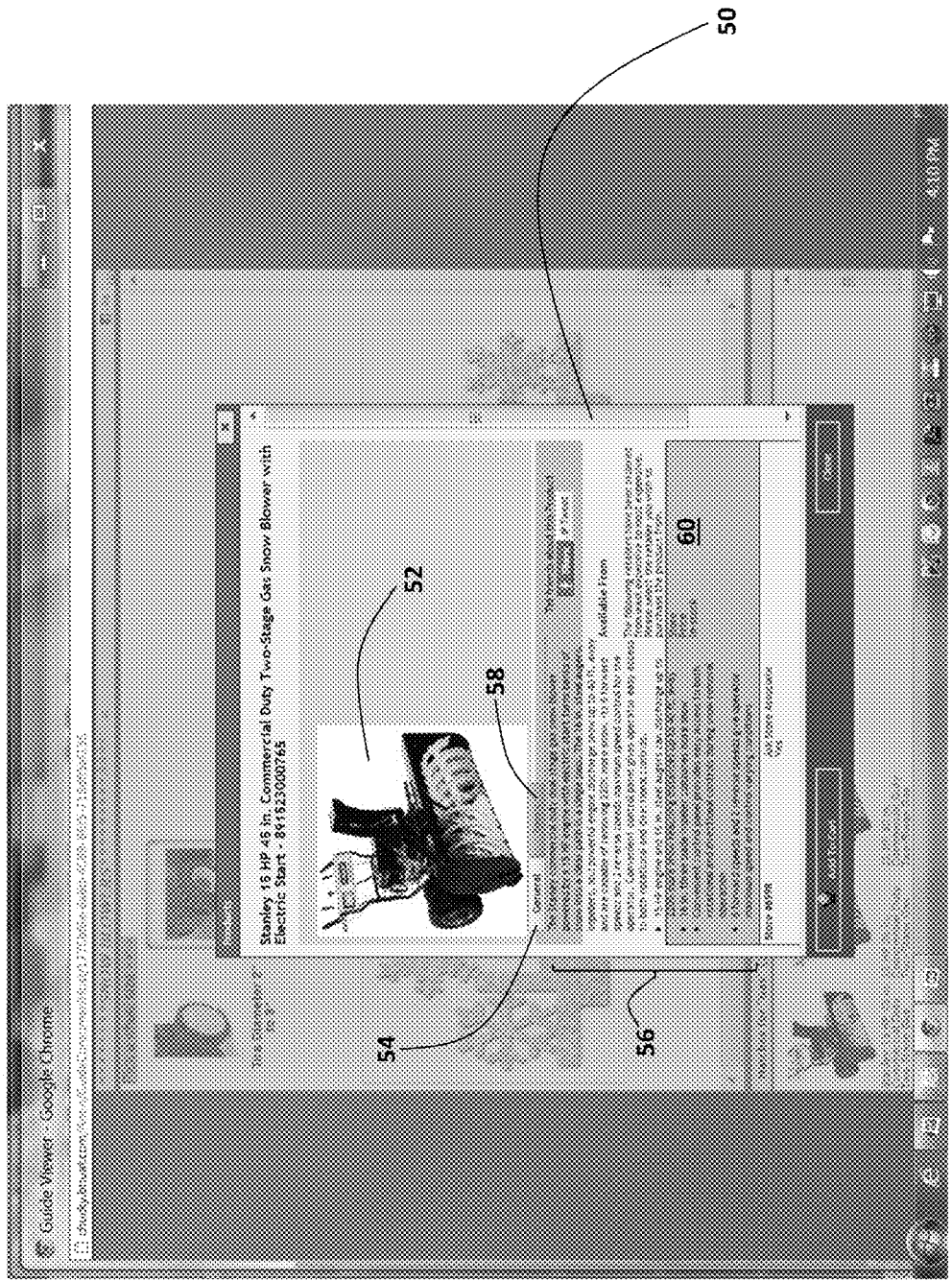
Figure 15:
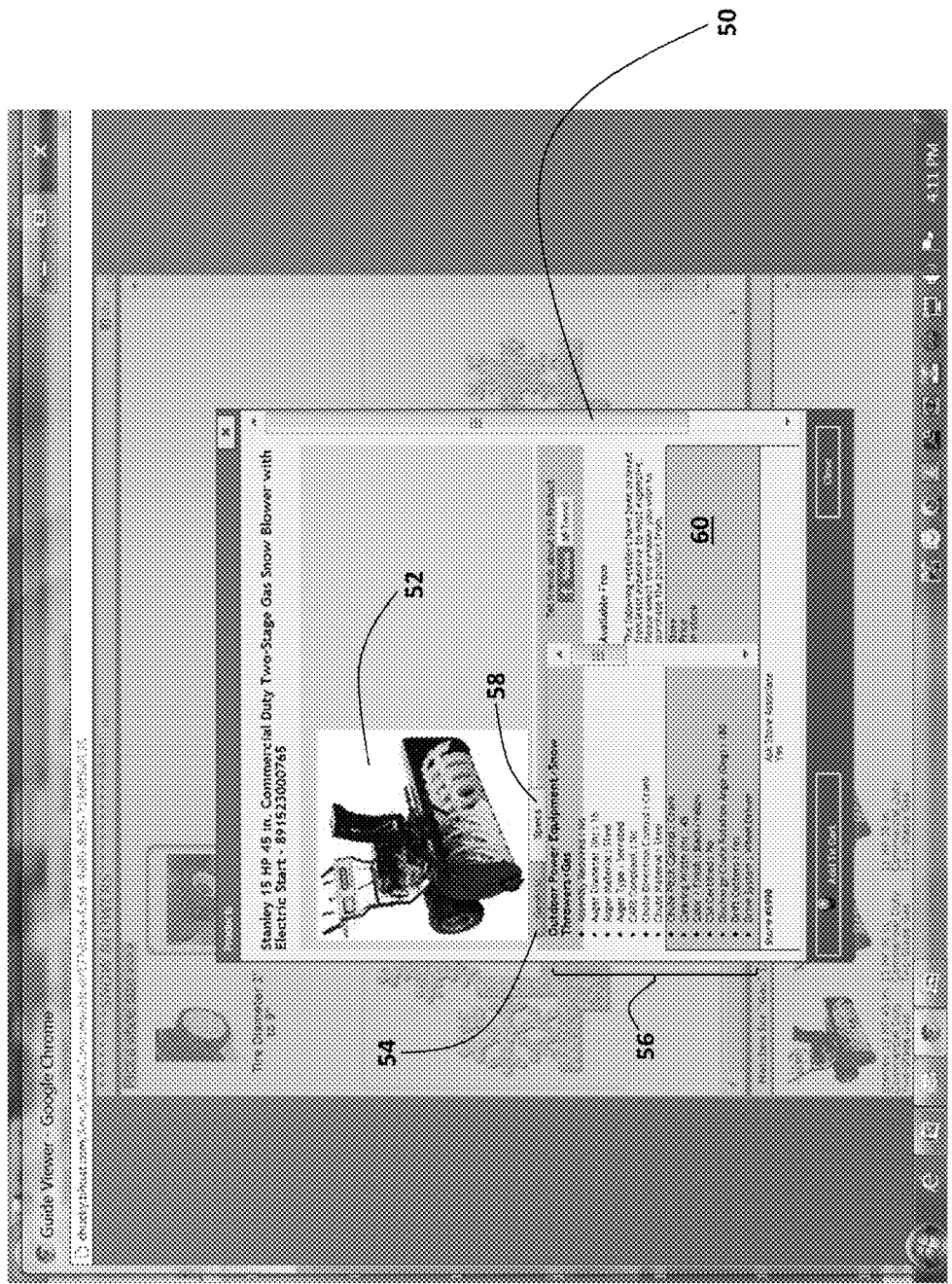

FIG. 14 depicts what happens when one of the product images shown in field 40 is selected. Each product image in field 40 is an active link that links to the server-side product database that contains the corresponding product data compiled into an ontology and a hierarchical taxonomy. By clicking on one of the product images in field 40, the product data corresponding to the product shown in the image is opened in a new window 50. This window preferably contains a number of fields as shown in FIG. 14. Field 52 depicts a larger, higher-resolution of the image whose corresponding data is displayed. Button 54 provides general information about the product that appears in field 56. Another button 58 will insert into field 56 the detailed product specifications for the product depicted in image 52. Field 60 lists the vendors where the product can be obtained, the offering price, and whether the item is in stock. FIG. 15 is the same as FIG. 14, but herein the "Specs" button 58 has been selected. Now, rather than general information or marketing data appearing in field 56, field 56 presents a highly detailed list of the specifications for the product depicted in image 52.

Figure 16:
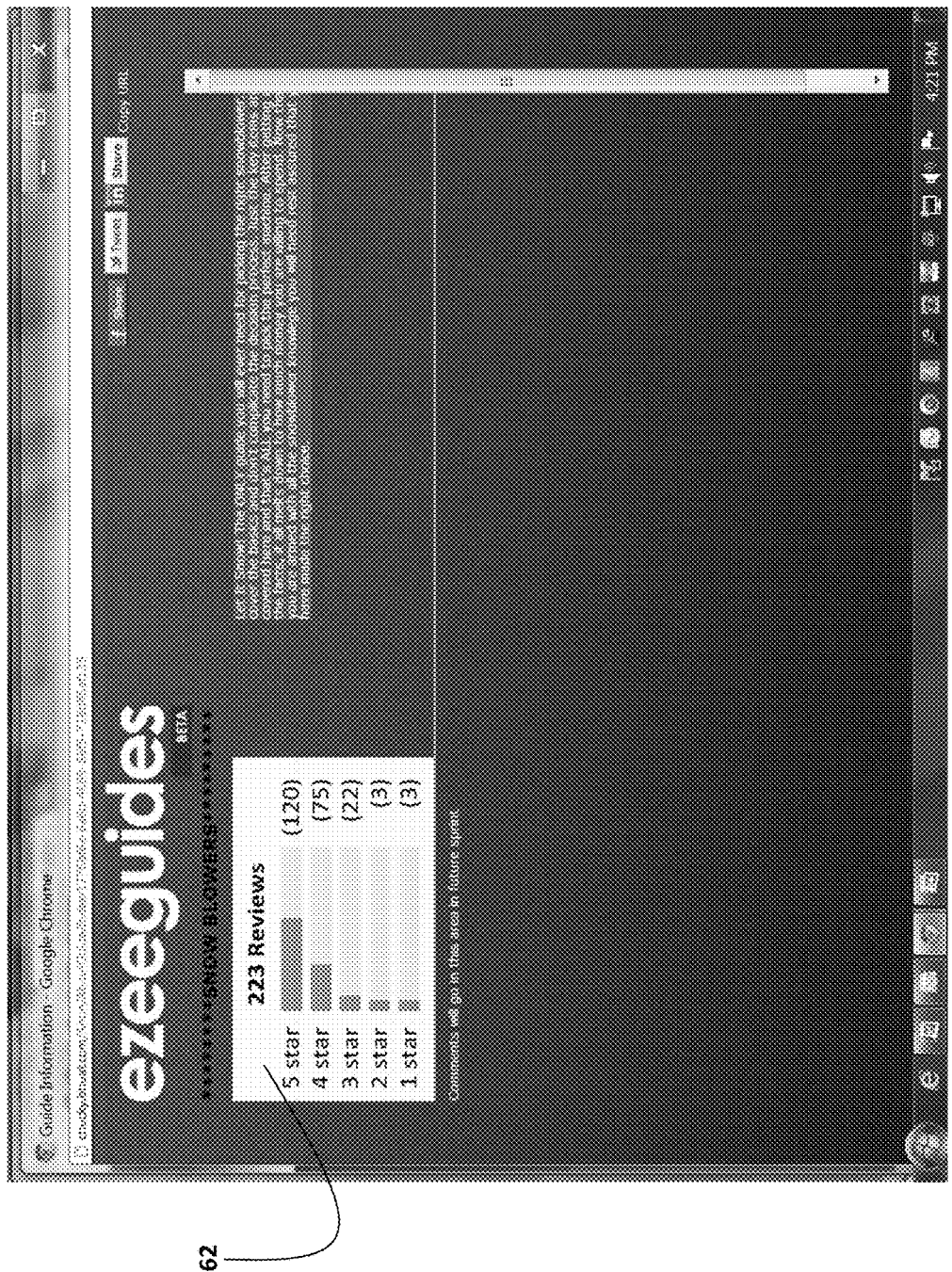

Referring momentarily back to FIG. 1, in FIG. 1 is a button 14 titled "About this guide." Clicking on that button takes the user to the screen depicted in FIG. 16, which includes a field to present information about the guide itself and the author of the guide, as well as a rating menu box 62 where readers of the product guide may input their evaluation of the guide.

Figure 17:
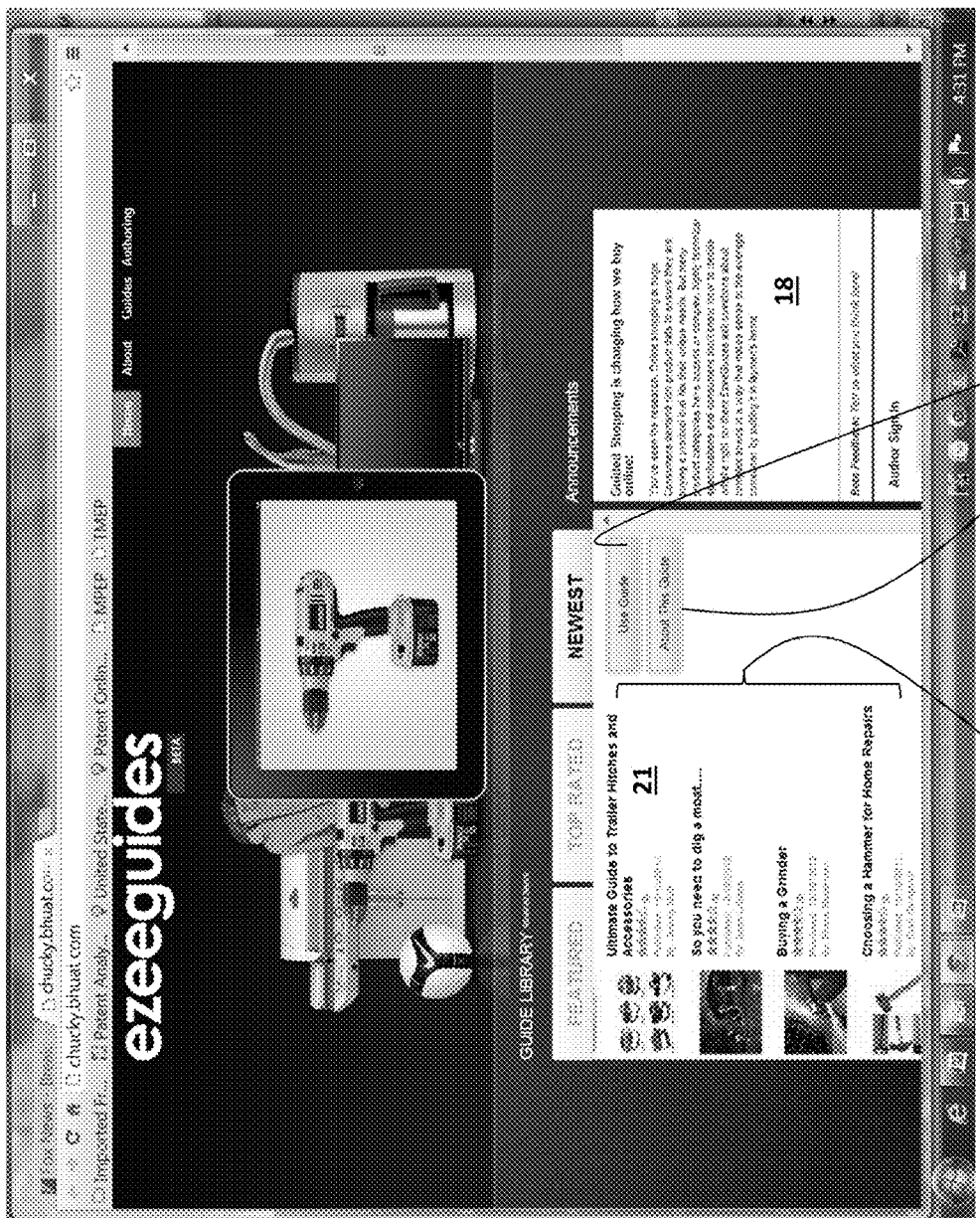
Figure 18:
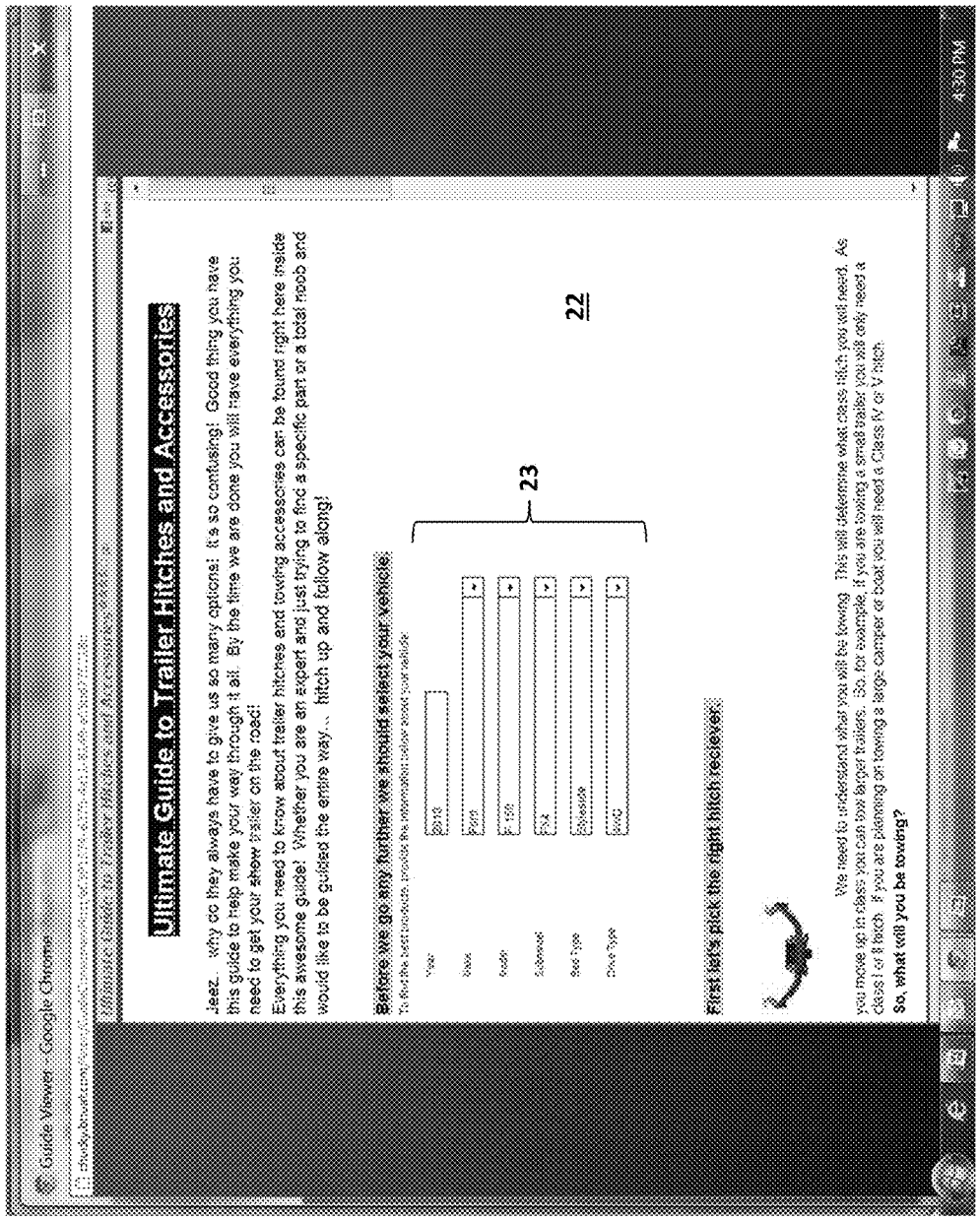
Figure 19:
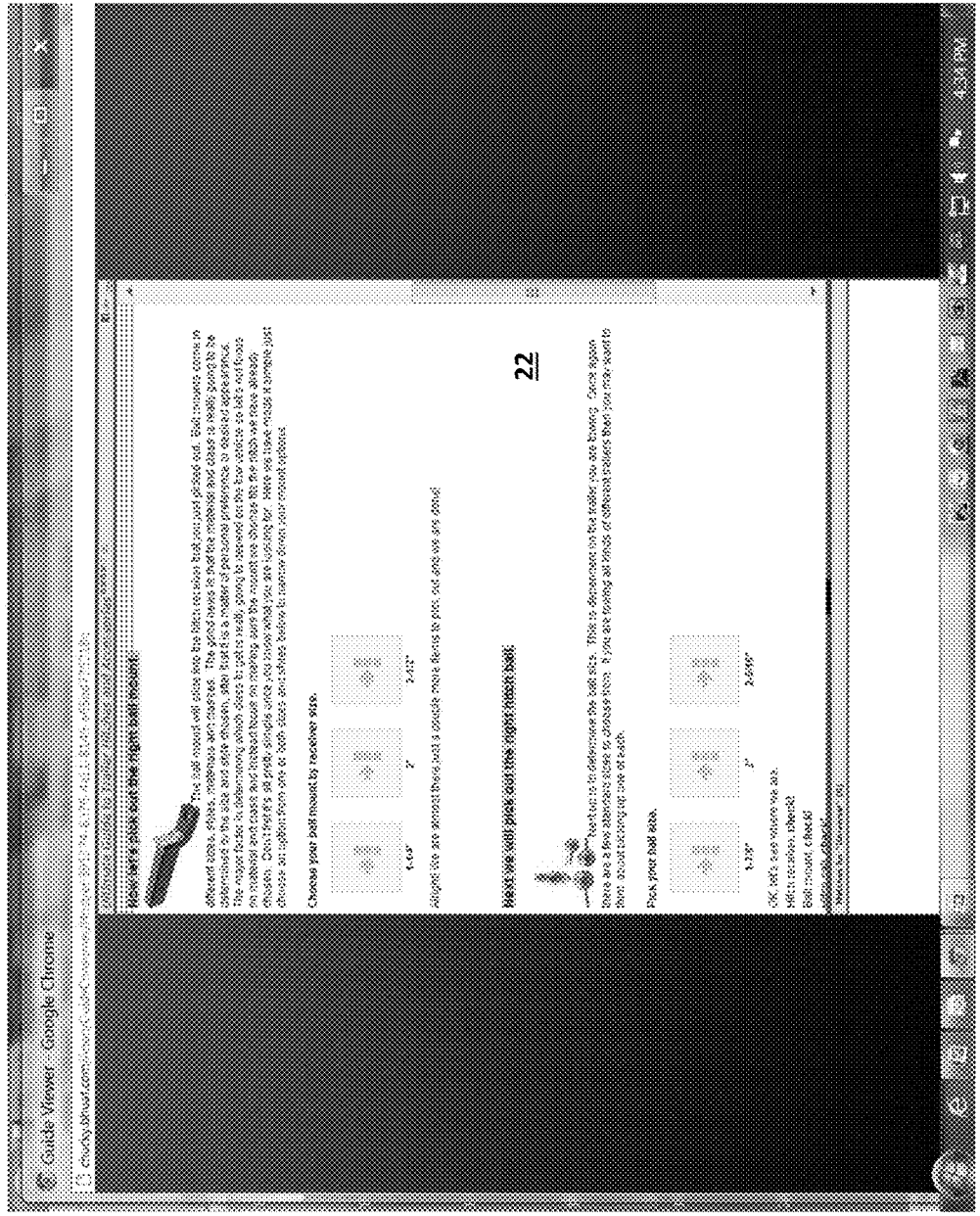

FIG. 17 is the same as FIG. 1, but emphasizes a different product guide in field 12. Rather than a single product guide 20 for snow blowers, FIG. 17 depicts a multiple product guide 21 for trailer hitches and accessories. These types of products are highly dependent upon the type of vehicle involved and what the user is intending to tow with the vehicle. Thus, when link 21 in FIG. 17 is selected, the user is taken to field 22 as shown in FIG. 18. Here, a vehicle bank 23 is presented that enables the user to input very detailed information about the vehicle to which the trailer hitch will be attached. As shown in FIG. 18, the vehicle bank 23 has six options for the user to complete: year, make, model, sub-model, bed type, drive type. Each option comprises a pull-down menu. The values available in the pull-down menu may be dependent on the selections of prior pull-down menus. For example, the final two options are specific to pickup trucks. As shown, the fields input into vehicle bank 23 in FIG. 18 describe a 2010 Ford F-150 model pickup truck with the FX4 styling, a Styleside bed and 4-wheel drive. The remainder of the guide field 22, shown in FIGS. 18 and 19 then presents only those trailer hitch options that are relevant to the vehicle described in the vehicle bank 23.

Figure 20:
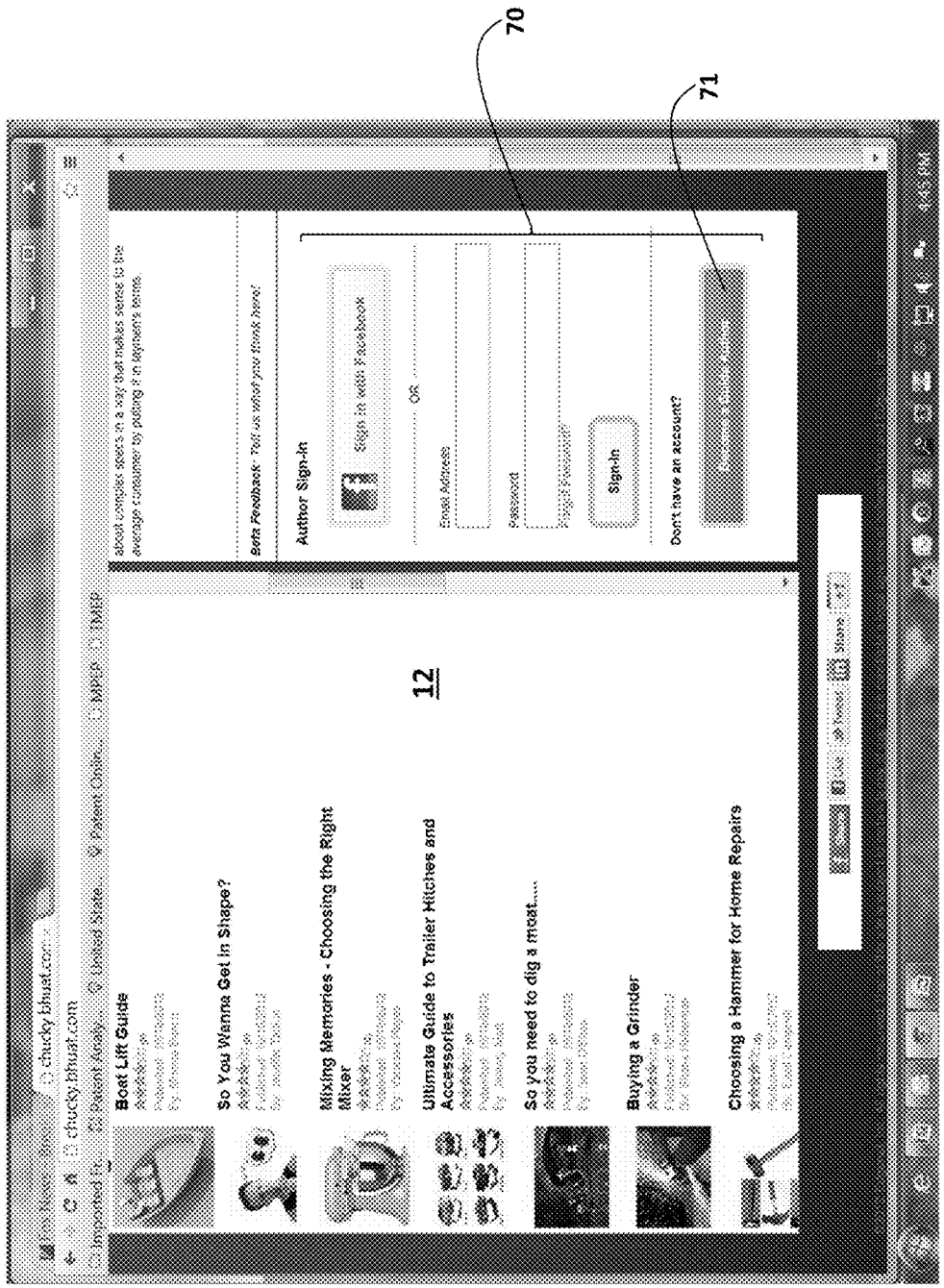
Figure 21:
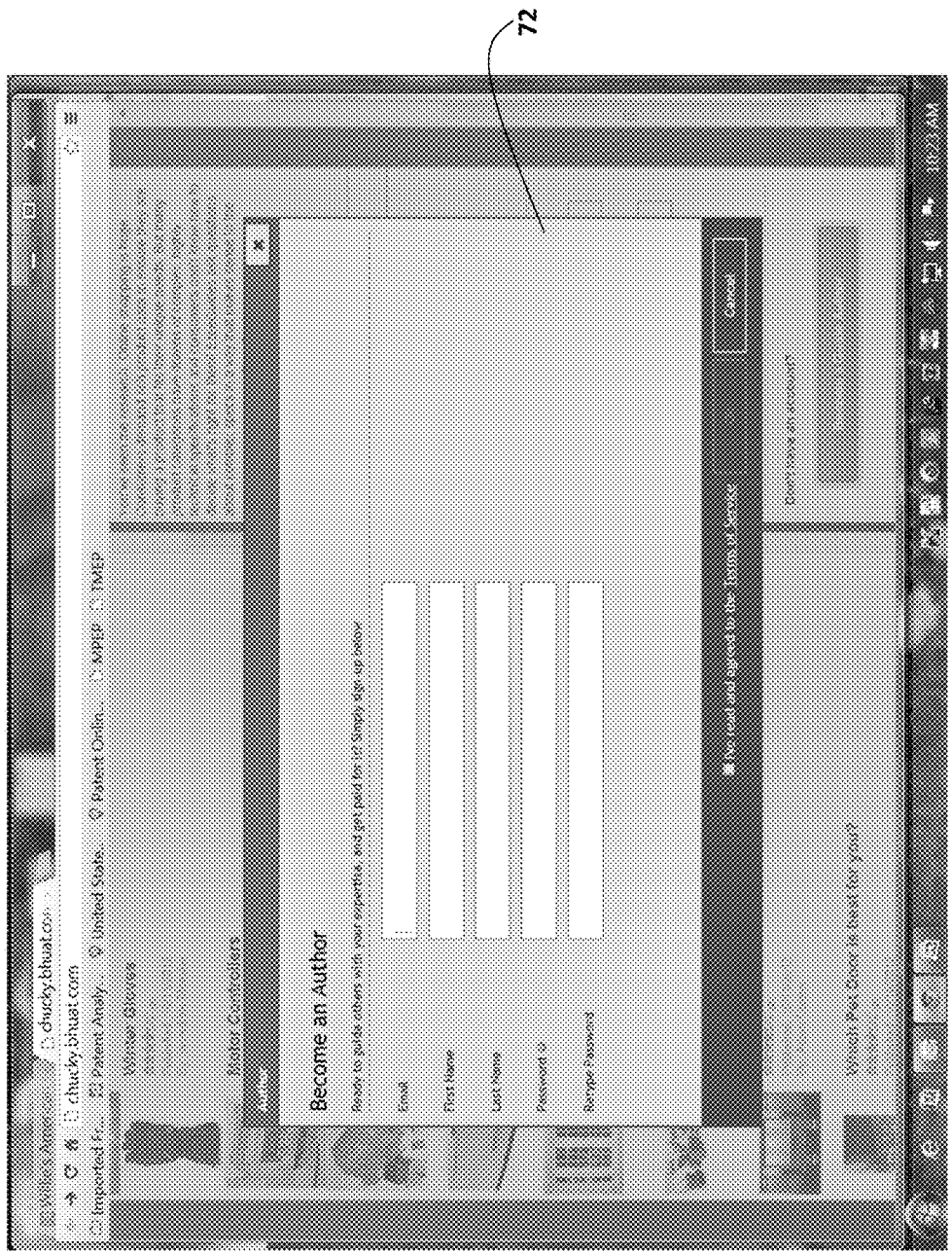

FIG. 20 through FIG. 27 illustrate the author-application side of the system—that is, the steps for drafting a product guide, generating the options appearing in the product guide, and linking the options to the items in the product database, among others. As shown in FIG. 20, which is a magnified view of the home page depicted in FIG. 1, the page includes a field 70 for becoming a guide author. If a user clicks on the link 71 "Become a Guide Author" in lower right-hand corner of FIG. 20, the user is taken to menu 72 as shown in FIG. 21. The author then inserts the relevant biographical information, as noted in the figure.

Figure 22:
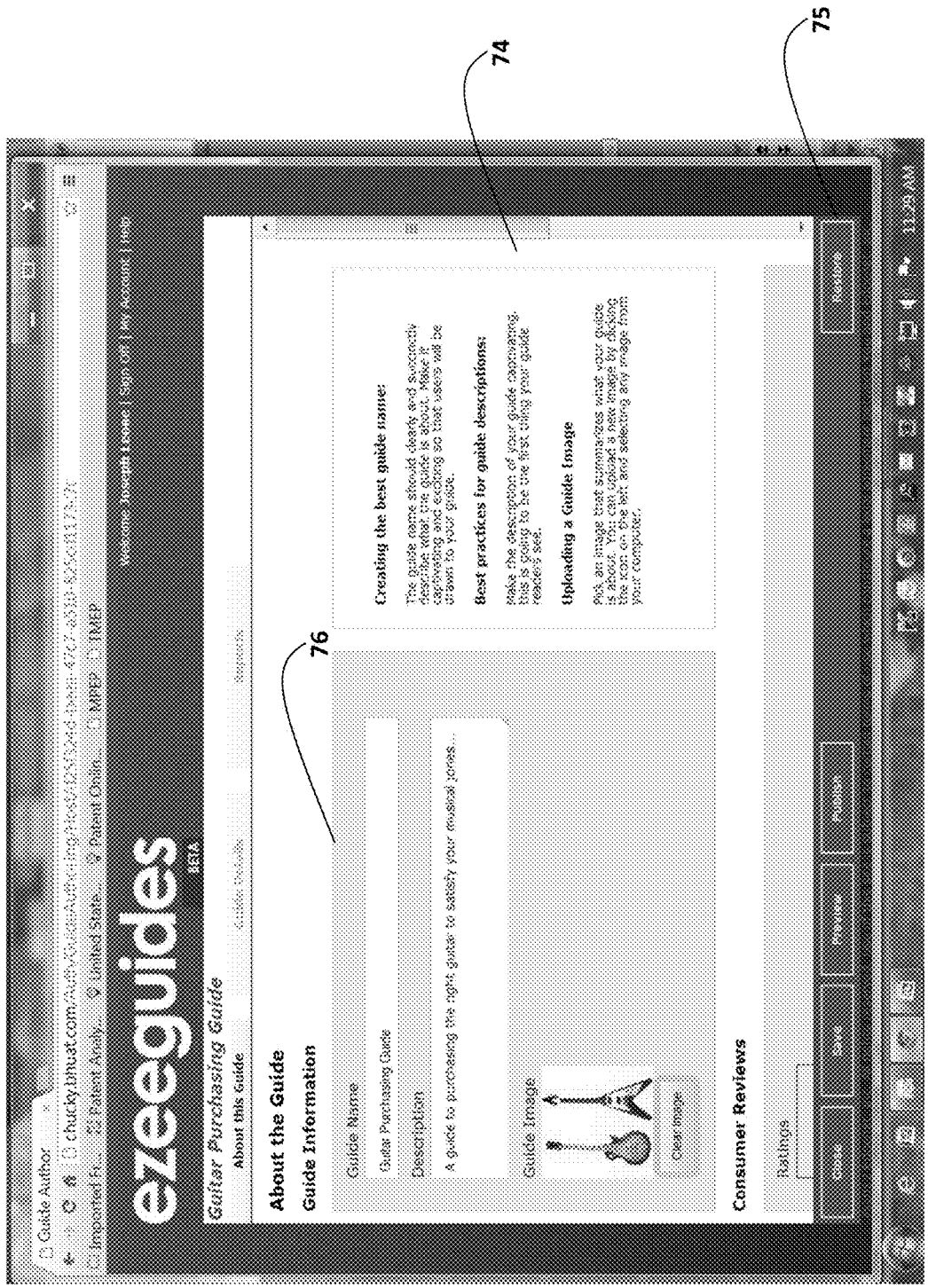

Once the author's identity is logged into the system, the author then writes a brief introduction to the guide, as shown in FIG. 22. Here, a field 74 is presented that includes a sub-field 76 into which is placed the guide name, a brief description of the guide, and an image to accompany the guide when it is published online. As shown in the figure, this is the start of a guitar guide. A lower tool bar 75 includes commands to close the window, save the guide, preview the guide, publish the guide, and restore the guide to its immediately prior status.

Figure 23:
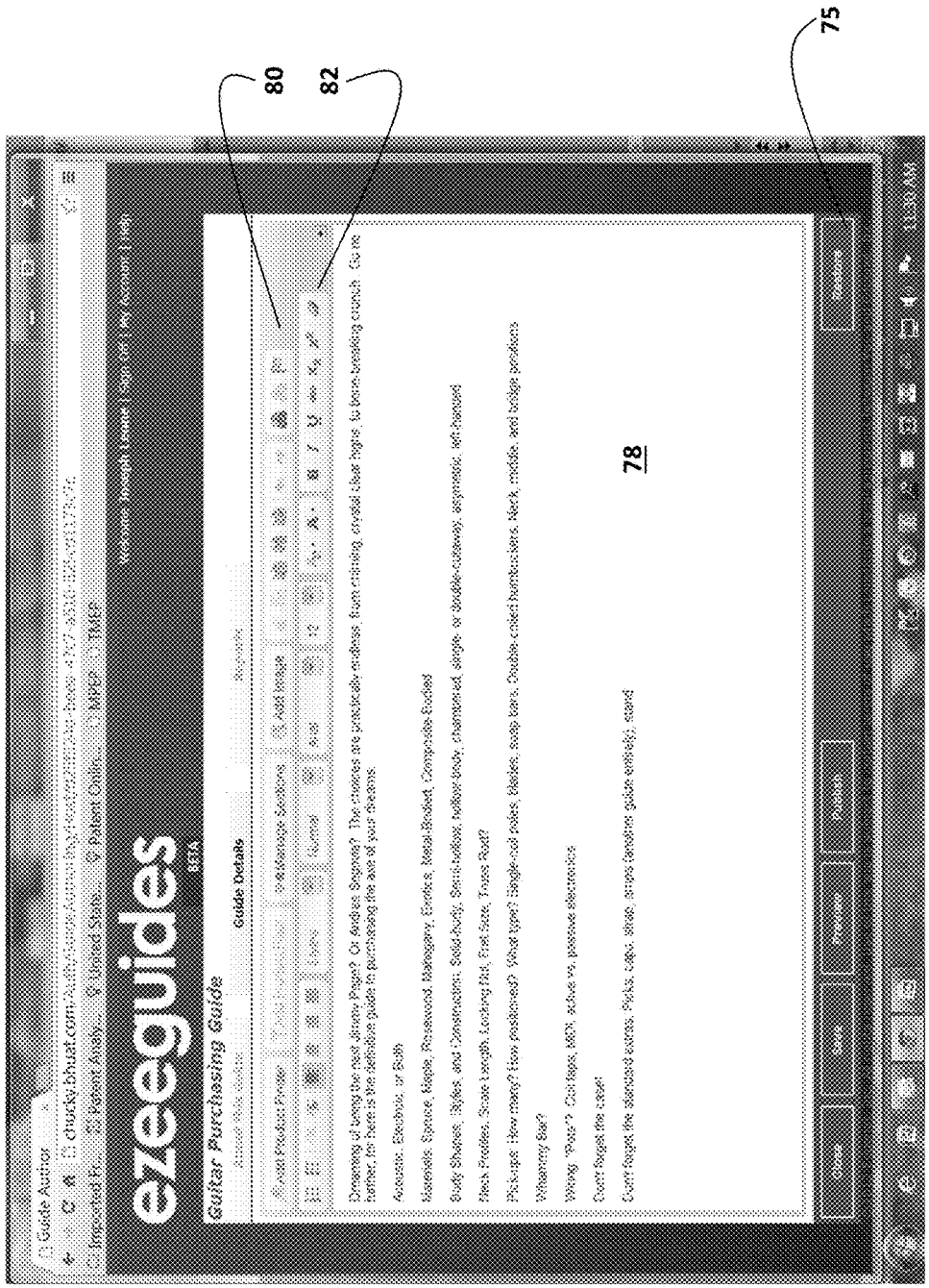

Once field 74 is completed and saved, the author is directed to the guide authoring window 78, shown in FIG. 23. The guide authoring window includes the lower tool bar 75 as described previously, as well as two additional toolbars. Tool bar 82 is a text formatting window that includes a series of word processing commands that are familiar to users of conventional word-processing software programs. Tool bar 82 includes conventional formatting commands such as font style, size, position (e.g., superscript, subscript), bold text, italics, underline, justification tools, tools for creating numbered or bulleted lists, etc. Tool bar 80 includes a series of command buttons to add options in the form of text or images to the guide authoring window 78 and to link those options to the items contained in the product information database. Field 78 shows a very rough outline of a guitar-purchasing product guide. As can be seen from the figure, the outline includes several major topics, such as electric versus acoustic guitars, body shapes, neck profiles, accessories such as cases, picks, straps, etc. Hyperlinks to external website URLs can be added in this field 78. For example, the user can enter the text "guitar strings," into field 78 and make it a Hyperlink link to the URL of a specific guitar string manufacturer.

Figure 24:
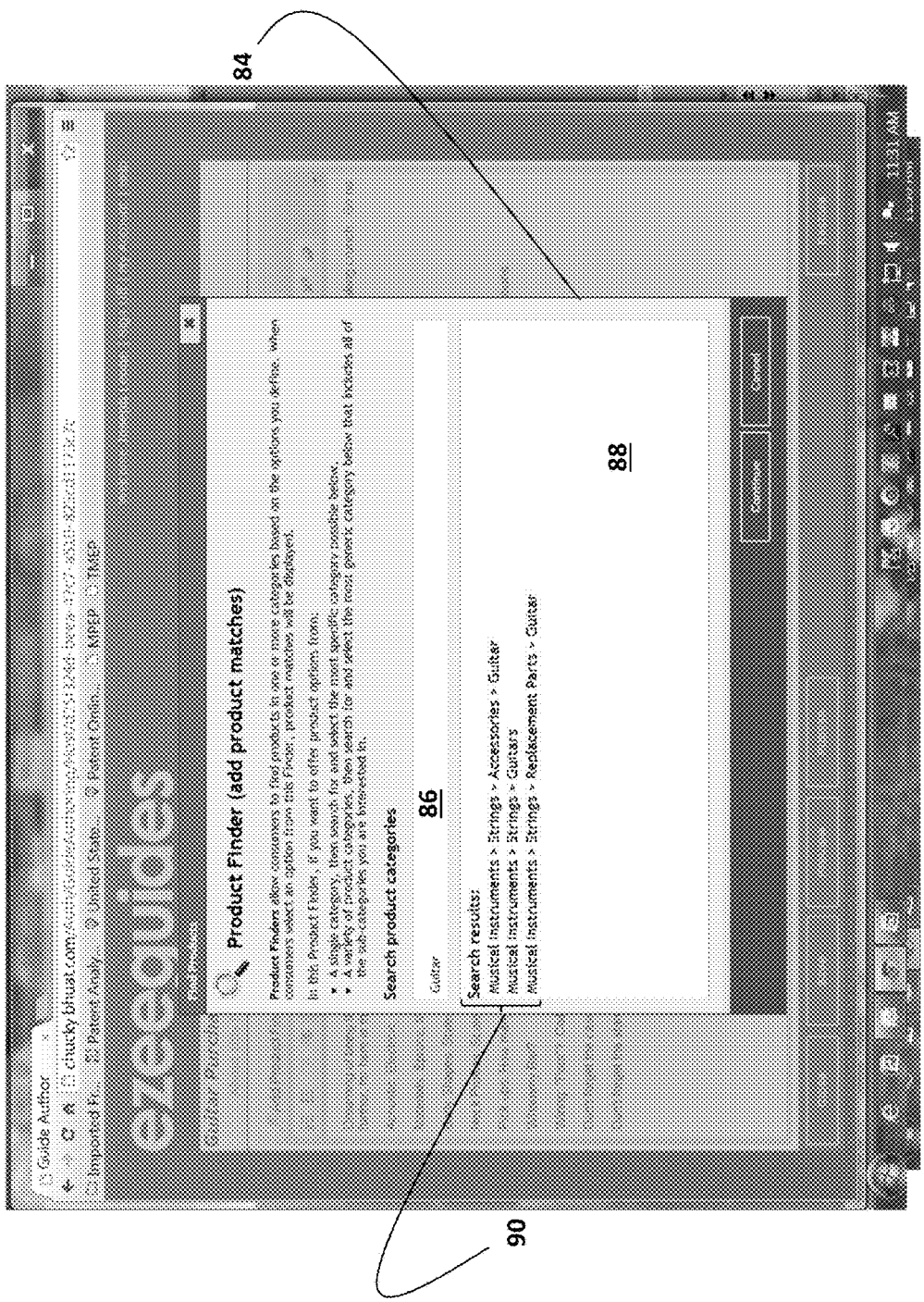
Figure 25:
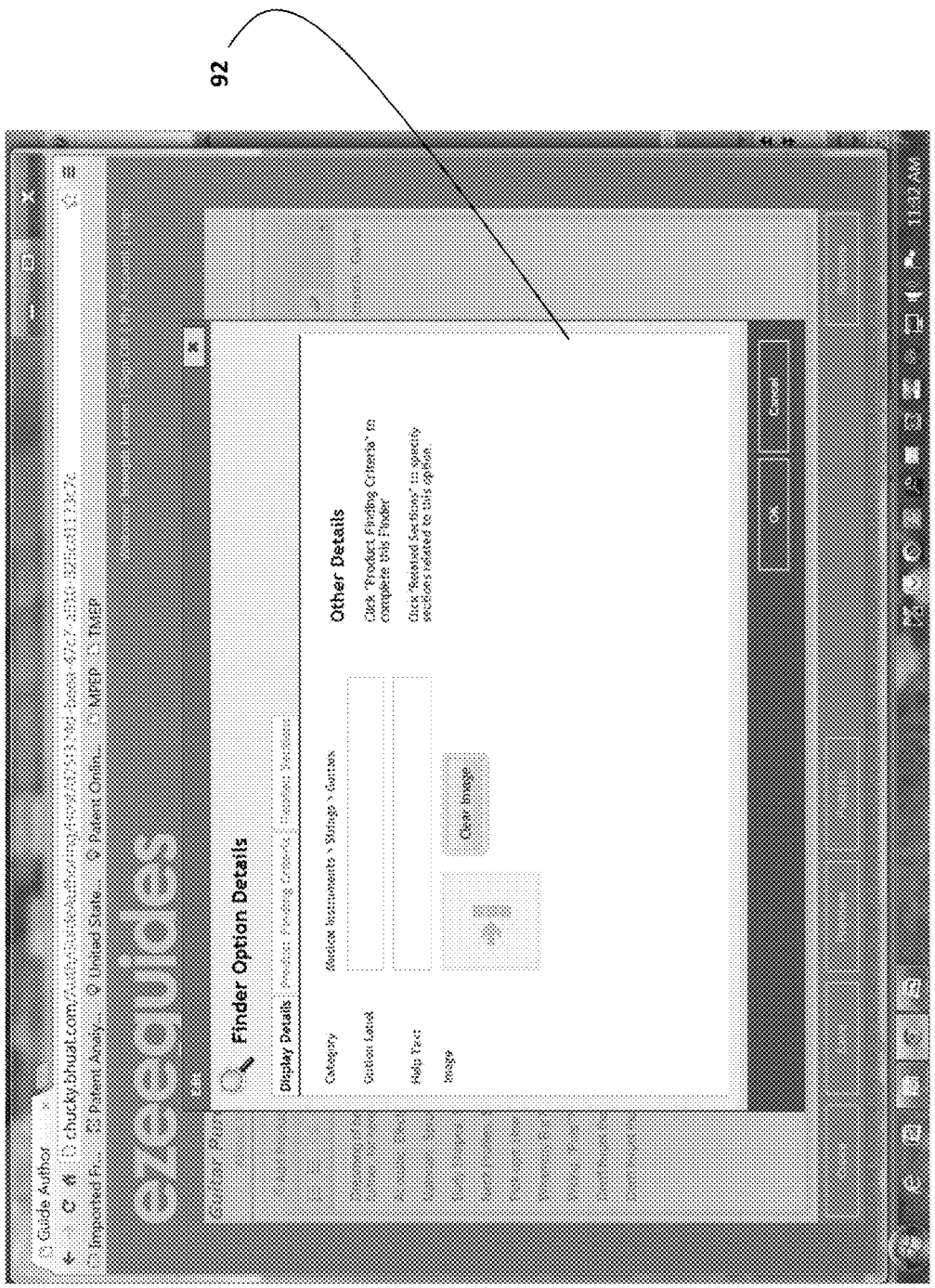

The user can generate appropriate options for selecting guitars in field 78 and link these options to the items in the product database by selecting the "Add Product Finder" button tool bar 80. Selecting the "Add Product Finder" button brings up menu box 84 as shown in FIG. 24. If the guide author wants to provide an option for selecting all guitar strings available for sale in the product database, for example, the author can use the search window 86 to search for "guitars." This will bring up results 90, as shown in field 88, which comprise all of the items including the word "guitar" in the product database. The results 90 indicate that guitar strings are presented at three different nodes in the product database. Once the user identifies the relevant node for a desired option, the user selects the relevant node ("Musical Instruments>Strings>Guitars" in the present case) then clicks the "continue" button in FIG. 24. This brings up field 92 in FIG. 25. Here, the author can provide a label, help text, and/or an image to be displayed in the guide. This process is then repeated for all of the various options that the author would like to addresses in the review. There is no set pattern or model. The review can be as cursory or as exhaustive as the author wishes.

As noted above, certain option selections by a user will render certain later options unavailable (e.g., electric snow blowers do not have pull starters). These options are handled (i.e., displayed or hidden) using the "Manage Sections" menu depicted in FIG. 26, which is accessed by clicking on the "Manage Sections" button in tool bar 80 of FIG. 23. As shown in FIG. 26 itself, the menu box explains how to display only that product information that is relevant to a user's selected options.

When the guide is completed, the guide is saved using the save button in FIG. 23 and then published to the Internet using the "publish" button, also shown in FIG. 23.

Thus, the invention provides a blog-style product guide system that includes a combination of both static content and interactive, selectable, dynamic content. The resulting product items (i.e., product data pertaining to a particular product) can be filtered by product category, product attribute, attribute value or a combination thereof. The resulting product items are comparable within the guide itself, without leaving the guide. The guides permit users to specify "year, make, model" information while also permitting the specification of non-"year, make, model" information as well. Because of the linkage of the guides to the product database, the guides allows real-time filtering based on retailer/merchant pricing and availability without the need to modify the content or structure of the guides themselves.

In some versions of the invention, options that result in zero product matches are automatically disabled, thereby preventing consumers from reaching a "dead end." This allows consumers to determine quickly whether there is a product that meets all of the initially specified criteria.

In some versions of the invention, the guides permit the user to shop for products that are related to or compatible with a particular product item shown in the results. In such versions, the guide may be configured to display related and/or compatible products that either share the features of a selected product item or are compatible with the selected product item. For example, if the selected product item pertains to a particular car, the program may present in a sidebar covers or wheels that are compatible with the car.

In some versions of the invention, the guides provide a functionality for users to share guides, rate guides, share products, or rate products within their social networks (Facebook, Tumblr, etc.).

In some versions of the invention, the guides provide a functionality for users to filter products based on ratings provided by other consumers. For example, a selectable option may be "Display only those products that were rated 3-stars or better."

For authors, the author application is straightforward and intuitive to anybody who has even novice skills as a computer user. Preferably, the author application is a WYSIWYG-style interface ("what you see is what you get"). The author application allows the guide author to create blog-style guides comprising any combination of free-form text, images, dynamically visible sections, and selectable options. Furthermore, the author application enables authors to make changes to the guide content and to publish those changes in real-time, with no software deployment, to all sites and devices where the guide is accessible (or is to be made accessible).

Importantly, the author application permits authors to utilize existing server-side product categories to create buying guides for products in those categories, without creating the categories de novo. The author application allows the guides to be created and linked to product images, product categories, product attributes, and attribute values that are imported into the guide and presented to a user based on the user's inputs. Thus, the author can present knowledge in a systematic fashion, using already existing product taxonomies within server-side product databases. In short, the authors can utilize existing server-side product data, including product categories, product attributes, and attribute values, to create buying guides for those products, all without providing the product data to the application. This makes the process of generating accurate guides vastly easier and faster for the author. Moreover, because the guides link to the server-side product databases, the guides automatically update when the product databases are updated. This keeps each guide as current and as accurate as the databases to which it is linked. The guide author may also suggest data improvements and/or supply additional product information within the guide to improve the overall guide experience.

Because the author application enables authors to build guides independent of a specific product set (i.e., with no product data set) using the structured ontology, the guide can be applied to any product set that has been mapped to the ontology.

The author application also enables authors to build filters that combine multiple disparate and potentially unrelated categories, attributes, and values into a single filter option, allowing consumers to filter matching products across multiple product categories with a single click. This is a distinct advantage over attribute-based browsers, which deploy single attribute and/or value filtering.

In addition, the author application preferably includes the ability for the author to embed Boolean or other logical operators so that the user can focus a product search appropriately. Thus, the author application may enable the author to specify whether a consumer can select one or more answers at a time, and also to select whether those answers are evaluated independently ("OR") or together ("AND") or various combinations thereof ("NOT", "IF-THEN", etc.) to filter the matching products.

The author application is preferably configured to enable authors to build a single guide, independent of consumer delivery platform, such that guide can be deployed in .com (web browser agnostic) and mobile native, and TV formats, i.e., any environment or browser, and automatically sized and styled appropriately for the destination platform.

The author application preferably provides a functionality for searching for a likely product category that matches an image provided by the author. This assists the author in locating the relevant product category (or categories) within a product finder. Instead of having to manually search for (for example) snow blowers within the product database, the guide author can tender a digitized image of a snow blower as a search query to the product funder to yield the relevant categories in the product database. See U.S. Pat. No. 8,582,802 and US 2011/0085697.

"Computer" as used herein means any electronic device that is specially and permanently programmed to execute the method described herein (either via software code, hardware-implemented code, firmware-implemented code, or any combination thereof) or any electronic device that can be programmed to execute the method described herein (again via software, hardware, firmware, or any combination thereof), including (by way of example and not limitation), a single (or multiple) processor-based system that may be supported in a stand-alone (desktop, laptop, personal digital assistant), networked, mainframe, or client-server architecture, or other computing environment. The system used to execute the method may include one or more known storage devices (e.g., Random Access Memory (RAM), Read Only Memory (ROM), hard disk drive (HDD), floppy drive, tape drive, compact disk/write-read-ROM, DVD, bubble memory, etc.), and may also include one or more memory devices embedded within a processor, or shared with one or more of the other components. The computer programs or algorithms described herein may easily be configured as one or more hardware modules, and (vice-versa) any hardware modules shown may easily be configured as one or more software modules without departing from the invention. It is preferred that the product database is stored on a memory device independent of, but in communication with, the processor in which executes the presentation of the interactive product guide to the user. For example, the system may be implemented as a client-server system with the product database being comprised within the server and the interactive product guides being presented on a client module.

The elements and method steps described herein can be used in any combination whether explicitly described or not.

All combinations of method steps as used herein can be performed in any order, unless otherwise specified or clearly implied to the contrary by the context in which the referenced combination is made.

All references to singular characteristics or limitations of the present invention shall include the corresponding plural characteristic or limitation, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

The method described herein is computer program language independent. Thus, any programming language now known or developed in the future, may be used to implement the process in any given computer environment.

It is understood that the invention is not confined to the particular construction and arrangement of parts herein illustrated and described, but embraces such modified forms thereof as come within the scope of the claims.

What is claimed is:

1. A system for dynamically conveying product information comprising:
    a product database, stored on a storage device, comprising an ontology and a taxonomy, wherein the ontology comprises a plurality of items comprising product categories, product attributes, and product attribute values, and wherein the taxonomy comprises a hierarchical ordering of the plurality of items;
    at least one interactive product guide accessible to a user, each interactive product guide comprising:
    a dynamic option field, the option field presenting a plurality of product options to the user, wherein each product option in the plurality of product options is linked to at least one item in the product database, wherein the plurality of product options comprises a dynamically variable set of available product options available for selection by the user, wherein selection of one of the available product options generates a set of selected product options and a revised set of available product options, wherein the revised set of available product options is defined with respect to the set of selected product options in accordance with the hierarchical ordering of the plurality of items in the product database; and
    a result field presenting at least one product result, each of the at least one product result comprising product data for a product characterized by the items in the database linked to the product options in the set of selected product options.

2. The system of claim 1 wherein each of the product options in the revised set of available product options is linked to items contained on a branch of the hierarchical ordering stemming from items linked to the set of selected product options.

3. The system of claim 1 wherein the plurality of product options comprises the dynamically variable set of available product options available for selection by the user in addition to a dynamically variable set of unavailable product options that are unavailable for selection by the user, wherein selection of one of the available product options generates the set of selected product options, the revised set of available product options, and a revised set of unavailable product options, wherein the revised set of unavailable product options is defined with respect to the set of selected product options in accordance with the hierarchical ordering of the plurality of items in the product database.

4. The system of claim 3 wherein each of the product options in the revised set of unavailable product options is linked to items contained on a branch of the hierarchical ordering distinct from a branch stemming from items linked to the set of selected product options.

5. The system of claim 1 wherein each of the at least one product result comprises product data for a product characterized by the items in the database linked to the product options in the set of selected product options and further characterized by the items in the database linked to the product options in the revised set of available product options.

6. The system of claim 1 wherein the product database comprises product data for products characterized by the items, wherein the product data presented with the product result for the set of selected product options is capable of being changed by modifying the product data in the product database without changing the plurality of product options presented to the user and without changing the set of selected product options.

7. The system of claim 1 wherein the product data comprises one or more of a product image, a product name, a product manufacturer, a product retailer, product availability, product price, product dimensions, and product weight.

8. The system of claim 1 wherein the at least one interactive product guide comprises a plurality of interactive product guides, wherein at least a first of the plurality of interactive product guides presents a product option linked to a first product category, at least a second of the plurality of interactive product guides presents a product option linked to a second product category, and the first product category and the second product category are non-overlapping categories.

9. The system of claim 1 wherein the at least one interactive product guide comprises an interactive product guide presenting a first product option linked to a first product category and a second product option linked to a second product category, wherein the first product category and the second product category are non-overlapping categories.

10. The system of claim 1 further comprising an author application configured for generating one of the at least one interactive product guide, the author application comprising a functionality for generating an option in the product guide that is linked to at least one of the items in the product database.

11. The system of claim 1 further comprising an author application configured for generating one of the at least one interactive product guide, the author application comprising a functionality for searching the items in the database and a functionality for generating an option in the product guide that is linked to at least one of the items in the product database.

12. The system of claim 11 wherein the search item comprises one or more of a search term and a product image.

13. A method for dynamically conveying product information with a system as recited in claim 1 comprising, in a special-purpose computer or a suitably programmed general-purpose computer:
    presenting the at least one interactive product guide accessible to a user for interaction therewith, comprising:
    presenting the plurality of product options to the user, comprising generating a set of selected product options and a revised set of available product options upon selection of one of the available product options by the user, wherein the revised set of available product options is defined with respect to the set of selected product options in accordance with the hierarchical ordering of the plurality of items in the product database; and presenting at least one product result, each of the at least one product result comprising product data for a product characterized by the items in the database linked to the product options in the set of selected product options.

14. The method of claim 13, wherein the presenting the plurality of product options to the user further comprises presenting the revised set of available product options to the user.

15. The method of claim 13, wherein the presenting the plurality of product options to the user comprises generating the set of selected product options, the revised set of available product options, and a set of unavailable product options upon selection of one of the available product options by the user, wherein the set of unavailable product options is defined with respect to the set of selected product options in accordance with the hierarchical ordering of the plurality of items in the product database.

16. The method of claim 13 wherein each of the at least one product result comprises product data for a product characterized by the items in the database linked to the product options in the set of selected product options and further characterized by the items in the database linked to the product options in the revised set of available product options.

17. The method of claim 13 further comprising changing the product data presented with the product result for the set of selected product options by modifying product data stored in the product database without changing the plurality of product options presented to the user and without changing the set of selected product options.

18. The method of claim 13 wherein the presenting the at least one interactive product guide comprises presenting a plurality of interactive product guides, wherein at least a first of the plurality of interactive product guides presents a product option linked to a first product category, at least a second of the plurality of interactive product guides presents a product option linked to a second product category, and the first product category and the second product category are non-overlapping categories.

19. The method of claim 13 wherein the presenting the at least one interactive product guide comprises presenting, in one of the at least one interactive product guide, a first product option linked to a first product category and a second product option linked to a second product category, wherein the first product category and the second product category are non-overlapping categories.

20. The method of claim 13 further comprising presenting an author application configured for generating one of the at least one interactive product guide to a user for interaction therewith, the author application comprising a functionality for generating an option in the product guide that is linked to at least one of the items in the product database.

21. The method of claim 13 further comprising presenting an author application configured for generating one of the at least one interactive product guide to a user for interaction therewith, the author application comprising a functionality for searching the items in the database and a functionality for generating an option in the product guide that is linked to at least one of the items in the product database.

* * * * *